(12) United States Patent
Senarath et al.

(10) Patent No.: US 10,856,183 B2
(45) Date of Patent: Dec. 1, 2020

(54) SYSTEMS AND METHODS FOR NETWORK SLICE SERVICE PROVISIONING

(71) Applicants: Nimal Gamini Senarath, Ottawa (CA); Xu Li, Nepean (CA); Hamidreza Farmanbar, Ottawa (CA); Ngoc Dung Dao, Ottawa (CA); Philippe Leroux, Ottawa (CA); Hang Zhang, Nepean (CA)

(72) Inventors: Nimal Gamini Senarath, Ottawa (CA); Xu Li, Nepean (CA); Hamidreza Farmanbar, Ottawa (CA); Ngoc Dung Dao, Ottawa (CA); Philippe Leroux, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 15/805,043

(22) Filed: Nov. 6, 2017

(65) Prior Publication Data

US 2018/0132138 A1    May 10, 2018

Related U.S. Application Data

(60) Provisional application No. 62/420,378, filed on Nov. 10, 2016.

(51) Int. Cl.
*H04W 28/24*    (2009.01)
*H04L 12/24*    (2006.01)
(Continued)

(52) U.S. Cl.
CPC ......... *H04W 28/24* (2013.01); *H04L 41/0806* (2013.01); *H04L 41/0813* (2013.01);
(Continued)

(58) Field of Classification Search
None
See application file for complete search history.

(56) References Cited

U.S. PATENT DOCUMENTS

2004/0030777 A1\* 2/2004 Reedy ..................... G06F 9/542
                                                        709/224
2016/0156513 A1\* 6/2016 Zhang ..................... H04W 4/70
                                                        709/220
(Continued)

FOREIGN PATENT DOCUMENTS

CN    105813195 A    7/2016
CN    106060900 A    10/2016

OTHER PUBLICATIONS

Web Services Architecture Overview. <https://www.ibm.com/developerworks/web/library/w-ovr/>. Sep. 6, 2000 (Year: 2000).\*
(Continued)

*Primary Examiner* — Scott B Christensen

(57) ABSTRACT

A method of providing a network slice service includes a mobile network operator (MNO): providing one or more service profiles to a virtual service provider (VSP) serving a user population including a plurality of user devices, each service profile comprising attributes defining characteristics of a respective network slice service offered by the MNO, the network slice service comprising any one or more of: a Virtual Network with E2E service requirements; a Virtual Network with a specified network topology; and a virtualized infrastructure. The MNO receives a request for a selected network slice service from the VSP; determines whether or not the requested service can be provided; and responsive to determining that the requested service can be provided: sending a Service Level Agreement (SLA) for the network slice service to the VSP; and subsequently facilitating a network slice service instance in accordance with the SLA.

25 Claims, 23 Drawing Sheets

(51) Int. Cl.
*H04L 12/911* (2013.01)
*H04W 24/02* (2009.01)
*H04W 48/18* (2009.01)
*H04L 12/801* (2013.01)

(52) U.S. Cl.
CPC .......... *H04L 41/12* (2013.01); *H04L 41/5041* (2013.01); *H04L 47/78* (2013.01); *H04W 24/02* (2013.01); *H04W 48/18* (2013.01); *H04L 47/14* (2013.01)

(56) References Cited

U.S. PATENT DOCUMENTS

| | | | |
|---|---|---|---|
| 2016/0294643 A1* | 10/2016 | Kim | H04L 67/16 |
| 2016/0353465 A1* | 12/2016 | Vrzic | H04W 12/06 |
| 2017/0141973 A1* | 5/2017 | Vrzic | H04W 24/08 |
| 2017/0164349 A1* | 6/2017 | Zhu | H04W 48/18 |
| 2017/0332226 A1* | 11/2017 | Bharatia | H04W 76/12 |
| 2017/0357528 A1* | 12/2017 | Puranik | G06F 9/45558 |

OTHER PUBLICATIONS

International Search Report dated Jan. 29, 2018 for corresponding International Application No. PCT/CN2017/109988 filed Nov. 8, 2017.
CATT S2-163380 Service Triggered Network Slice Selection Procedure 3GPP SA WG2 Meeting #116. Jul. 11-15, 2016.
NEC R3-161977 TP Related to Additional Slicing Topics 3GPP TSG-RAN WG3 Meeting #93. Aug. 22-26, 2016.
Rachid El Hattachi et al, NGMN Alliance, "5G White Paper" Version 1.0, TR28.801. Feb. 17, 2015.
3GPP TR 28.801 "Study on management and orchestration of network slicing for next generation network", Version 2.0, Sep. 2016.
NGMN 5G P1, Peter Hedman, NGMN Alliance, "Description of Network Slicing Concept", Version 1.0, Jan. 13, 2016.
3GPP TR 23.799. "Study on Architecture for Next Generation System" vol. 1.0.2, Sep. 2016.

* cited by examiner

| Customer Service | Business Service Type1 (level 1) | Service Type1 | Quality Type1 Parameter Range | Capacity as throughput | Authentication Type1 |
| | | | | | Authentication Type2 |
| | | | | Capacity as number of users | Authentication Type1 |
| | | | | | Authentication Type2 |
| | | Service Type2 | Quality Type1 Parameter Range | Capacity as throughput | Authentication Type1 |
| | | | | | Authentication Type2 |
| | | | | Capacity as number of users | Authentication Type1 |
| | | | | | Authentication Type2 |
| | Business Service Type1 (level 2) | Service Type1 | | | Authentication Type1 |
| | | | | | Authentication Type2 |
| | | | | | Authentication Type1 |
| | | | | | Authentication Type2 |

Table 1: Example Global Customer Service Categorization Structure

FIG. 6

| Category Level 1 | Category Level 2 | Category Level 3 | Category Level 4 |
|---|---|---|---|
| Business Service Type | (Service Type parameter – topological/service chain requirement) | (Service Quality requirement parameters – associated with category 2 types) | Capacity, Performance (Throughput, capability for # of session, users etc. Network KPI, per service KPI) specification parameters |
| E2E service for a customer's end user population to satisfy overall user satisfaction, e.g. Network KPI, individual service KPI (Service Instance) | A server communicating with multiple devices<br>Multiple UEs to Multiple Servers/PDNs<br>V2V service<br>Streaming service<br>Emergency type short messages (100K-2M UEs in one city)<br>General mobile broadband service<br>IoT non-emergency (100k-2M+ in one city) non-delay sensitive | Different types of flows and related NFs<br>QoS ranges<br>KPI | Expected number of simultaneous active services during different time slots in different geographical areas |
| Network Topology (NaaS) | NF chain<br>Logical Topology with ingress outgress points and usage (data forwarding) methods<br>Resource type<br>VNF access method<br>Controlling elements and controlling methods | Types of flows and related NFs<br>QoS ranges<br>KPI | Link throughputs<br>Outage specifications |

Table 2: Example Global Customer Service Categorization

FIG. 7A

| Category Level 1 | Category Level 2 | Category Level 3 | Category Level 4 |
|---|---|---|---|
| Network Topology with 3rd party control (NaaS) | NF chain<br>Logical Topology with ingress outgress points and usage (data forwarding) methods<br>Resource type<br>VNF access method<br>Controlling elements and controlling methods | Types of flows and related NFs<br>QoS ranges<br>KPI | Link throughputs<br>Outage specifications |
| VNF as a service (VNFaaS) | VNF functionality<br>How LCM is done<br>Access method and instantiation delays<br>Performance/usage data – collection information<br>Borrowing times and charges<br>Resource information | KPI | |
| Resources (IaaS) | Resource type<br>Controlling method<br>Location and/or connectivity information<br>Borrowing times and charges | KPI | |
| Other services (Data analytics as a service, location as a service, etc.) | | KPI | |

Table 2( cont.): Example Global Customer Service Categorization

FIG. 7B

| Composition Possibilities | Network/Service Virtual Function Graph | | Network Logical Topology | | | Capability (E2E Service, BW resource/capability of connections) | | | Transport Protocols | |
|---|---|---|---|---|---|---|---|---|---|---|
| | Service Functions | Internal Network Functions | Inter-connections among Functions | PoP of each function and instance | Logical Connections among functions/ PoPs (rates) | E2E Service | Logical Resource | Physical Resource (path and rate) | Default Protocols (not service specific) | Service Specific Protocol |
| A | Y | | Y | | | | | | | |
| B | Y | | Y | | | Y | | | | |
| C | Y | Y | Y | | | | | | | |
| D | Y | Y | Y | | | Y | | | | |
| E | Y | Y | Y | Y | | Y | | | | |
| F | Y | Y | Y | Y | Y | Y | Y | | | |
| G | Y | Y | Y | Y | Y | Y | Y | Y | | |
| H | Y | Y | Y | Y | Y | Y | Y | Y | Y | Y |

A. MNO's public service database  
B. Customer Request  
C. Network Slice Template  
D. Network Service Descriptor E. Instantiated Network Slice without resources  
F. Completed Network Slice  
G. Slice in operation (with Customer traffic)  
H. Slice in operation with customized protocol Cloud resource – NF could be shared or dedicated  
Bandwidth of links in the logical topology could be shared or dedicated Shown here are some example compositions. There may be many other combinations Table 3. Example of a slice service composition representation at various stages of its lifecycle.

FIG. 8

| Time Slot | Region | Service Type | Traffic Demand | Penalty |
|---|---|---|---|---|
| 1 | A | s1 | m1, v1 | F1, t1 |
| 1 | A | s2 | m2, v2 | F2, t2 |
| 1 | A | s3 | m3, v3 | F3, t3 |
| 1 | B | s1-s3 | -- | -- |
| 1 | C | s1-s3 | -- | -- |
| 1 | A | s1-s3 | -- | -- |
| 2 | B | s1-s3 | -- | -- |
| 2 | -- | s1-s3 | -- | -- |
| -- | | | | |

Table 4. Example geographical and time traffic demand distribution specification

FIG. 9

SYSTEMS AND METHODS FOR NETWORK SLICE SERVICE PROVISIONING

CROSS-REFERENCE TO RELATED APPLICATIONS

This Application is based on, and claims benefit of, U.S. provisional patent application No. 62/420,378 filed Nov. 10, 2016, the entire content of which is hereby incorporated herein by reference.

FIELD OF THE INVENTION

The present invention pertains to the field of network communications, and in particular to systems and methods for network slice service provisioning in communications networks.

BACKGROUND

Communication networks enabled by technologies such as network function virtualization (NFV), and software defined networking (SDN) may be flexibly organized so as to serve various customer/business demands. In building advanced networks, such as those to support future developments in wireless networks (including next generation wireless, such as so-called fifth generation (5G) networks), network slicing provides the ability to create isolated virtual networks over which different traffic flows can travel. Network slicing provides flexibility and adaptability in the characteristics of each slice. This allows the slices to each have characteristics tailored to the specific needs of different services. This allows a plurality of different services to be supported by a single pool of network infrastructure, which is a desired feature for 5G networks. However, managing variable and competing demands on a potentially large network scale is a complex proposition requiring an effective architecture and management thereof. The problem of managing the different demands becomes exacerbated when there are demands for a number of different types of services.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved method and system for network slice service provisioning in a communications network.

Aspects of the present invention provide a method of providing a network slice service includes a mobile network operator (MNO): providing one or more service profiles to a virtual service provider (VSP) serving a user population including a plurality of user devices, each service profile comprising attributes defining characteristics of a respective network slice service offered by the MNO, the network slice service comprising any one or more of: a Virtual Network with E2E service requirements; a Virtual Network with a specified network topology; and a virtualized infrastructure. The MNO receives a request for a selected network slice service from the VSP; determines whether or not the requested service can be provided; and responsive to determining that the requested service can be provided: sending a Service Level Agreement (SLA) for the network slice service to the VSP; and subsequently facilitating a network slice service instance in accordance with the SLA.

In accordance with embodiments of the present invention, a method of obtaining a network slice service. The method comprises a virtual service provider (VSP) checking a global service repository to determine a mobile network operator (MNO) that can provide the network slice service, sending a request for a network slice service to the MNO, and receiving a service license agreement (SLA) for the network slice service from the MNO.

In accordance with embodiments of the present invention, there is also provided a method of providing a network slice service. The method comprises a mobile network operator (MNO) receiving a request for a network slice service from a virtual service provider (VSP), checking a global service repository to determine another MNO that can provide the network slice service, sending a request for the network slice service to the other MNO, receiving a MNO SLA for the network slice service from the other MNO, and sending a VSP SLA for the network slice service to the VSP.

In accordance with embodiments of the present invention, there is also provided a business service categorization data structure. The business service categorization data structure comprises at least one business service type identifier, at least one service type parameter associated with each of the at least one business service type identifiers, at least one service quality parameter associated with each of the at least one service type parameter, and at least one performance parameter associated with each of the at least one service type parameter.

BRIEF DESCRIPTION OF THE FIGURES

Further features and advantages of the present invention will become apparent from the following detailed description, taken in combination with the appended drawings, in which:

FIG. 6 is a table showing an example global customer/business service categorization;

FIGS. 7A and 7B are a table showing an example of a four category global business/customer service categorization;

FIG. 8 is a table showing a slice/service composition representation;

FIG. 9 is a table showing an example geographical and time traffic demand distribution specification;

It will be noted that throughout the appended drawings, like features are identified by like reference numerals.

DETAILED DESCRIPTION

Figure 1:
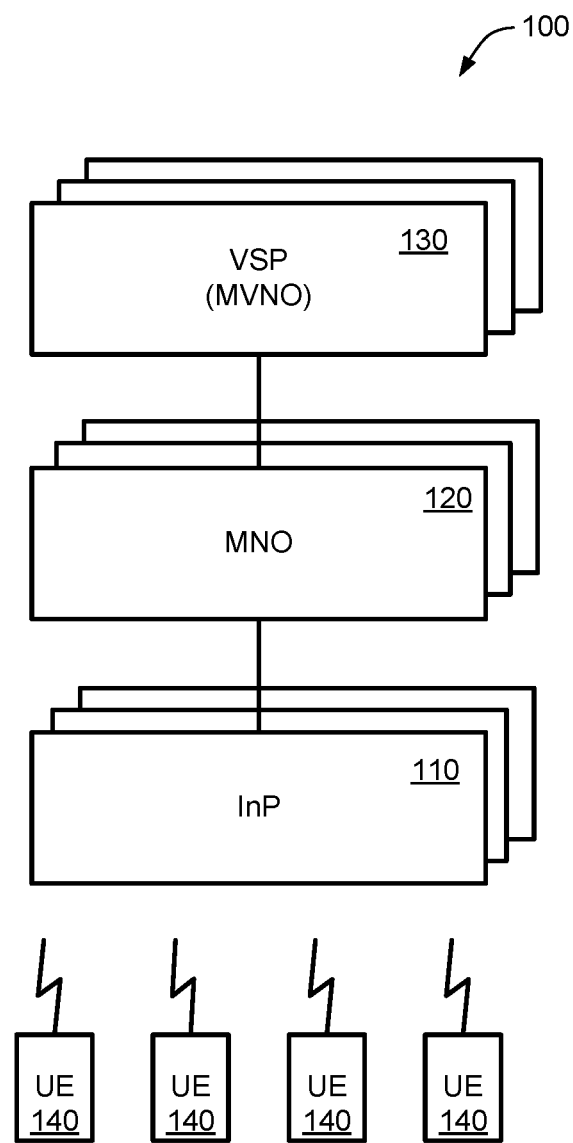
FIG. 1 illustrates, in a component diagram, an example of a 5G network environment, in accordance with an embodiment of the present invention.

A service instance is a run-time construct of an end-user service or a business service that may be realized within or by a network slice. A network slice instance is a set of run-time network functions, and resources to run these network functions, forming a complete instantiated logical network to meet certain network characteristics required by the service instance(s). A network slice instance may be fully or partly, logically and/or physically, isolated from another network slice instance. The resources comprise physical and logical resources. A network slice instance may be composed of sub-network instances, which as a special case may be shared by multiple network slice instances. The network slice instance is defined by a network slice blueprint. Instance-specific policies and configurations are used when creating a network slice instance. Network characteristics examples include ultra-low-latency, ultra-reliability, etc.

A network slice blueprint may be a complete description of the structure, configuration and the plans/work flows for how to instantiate and control the network slice instance during its life cycle. A network slice blueprint enables the instantiation of a network slice, which provides certain network characteristics (e.g., ultra-low latency, ultra-reliability, value-added services for enterprises, etc.). A network slice blueprint refers to required physical and logical resources and/or to sub-network blueprint(s). A network operator uses a network slice blueprint to create a network slice instance. A network slice instance provides the network characteristics which are required by a service instance. A network slice instance may also be shared across multiple service instances provided by the network operator.

As described in third generation partnership project (3GPP) technical report (TR) 23.799, a network slice template (NST) is a logical representation of the network function(s) and corresponding resource requirements necessary to provide the required telecommunication services and network capabilities.

Embodiments of the present invention are directed towards systems and methods for network slice service provisioning.

To provide network slicing services, a variety of interactions and network management functions are involved. Different service types of network slicing may request different management functions. Thus, it is necessary to define interfaces, relationships, involved management functions, and different options. In this disclosure, to realize the interaction between the customer and the operator in different service types, several frameworks are described to define the interaction between the customer and network management functions in the operator domain.

Customer Service Categories (or Types) that may be supported by a 5G network include:

Type (1): Virtual Network with E2E service requirements for a VN customer with its own user/device population. For example, a VSP 130 may have a requirement to provide an E2E communication service for a defined number of end users/devices within a defined geographical area, and for a defined period of time. The VSP may therefore request the MNO 120 to provide a Virtual Network service on which to implement the E2E communication service. The VSP 130 may also have certain specifications for performance, security, and packet priority for the required Virtual Network service. In specific embodiments, these specifications (which may reflect a Service Level Agreement between the VSP 130 and its user population) may include one or more Key Performance Indicators (KPIs). For example, the E2E communication service may be a voice service, which requires a Virtual Network having particular performance specifications which may be defined using KPIs pertaining to packet latency, packet priority, outage tolerance etc. On the other hand, a Type (1) service will generally not impose any requirements on the network structure or topology, because the MNO 120 is effectively responsible for meeting the Quality of Service (QoS) requirements of the E2E communication service. Nor will a Type 1 service specify network functions or function chains to be used (or excluded) by the MNO 120 to implement the requested service.

Type (2): Virtual Network with a Specific Topology for a VN customer. This Category may be similar to the Type (1) service category described above, but with the added requirement that the VSP 130 assumes responsibility for providing the QoS requirements of the E2E communication service. In order to satisfy the QoS requirements, the VSP 130 requests visibility and management control of at least some network topology elements and network functions. Accordingly, the VSP may manage the facilitation of services to its end user population including network function configuration.

Specific examples of Type (2) services a may include any one or more of:
  A Virtual Network with a Specific Topology and instantiated network functions;
  A Virtual Network with a Specific Topology and defined network function chains;
  A Virtual Network with a Specific Topology and pre-configured routing;
  A Virtual Network with a Specific Topology and including (or excluding) control or management by $3^{rd}$ parties.

Type (3): Specific Assets or Infrastructure, as described, for example, in "5G White Paper" Version 1.0, NGMN Alliance, February 2015. In specific embodiments, the Specific Assets or Infrastructure may comprise virtualized infrastructure. In this case, the customer may be provided with either one or both of network functions (VNFs/PNFs) or physical assets (such as, for example, one or more physical nodes) configured to host at least one network function. The customer may then instantiate or configure network functions as needed to facilitate the required service it needs to offer to its customers.

Type (4): On-demand connectivity for a single session (direct end user request from MNO). This may include multiple devices, No SLA directly to end users (e.g., video conference for one time, on-demand charging, reverse charging/free basic services, emergency services, pay as go, etc).

The above-noted categorization of service types is useful for automated service provision, service negotiation with customers and MNO-MNO negotiations. See, for example TR28.801.

The network services such as network slice services and network slice subnet services may be provided by different network operators (such as MNO 120) who have differing policies for exposure and arrangement of resources. Those different policies may result in having to use slicing services with varying amounts of management responsibilities by the customers (such as VSP 130) such as pre-configuration, The vendors developing such management systems and associated network components may facilitate such differing capabilities for network operators to use them according their policies.

The following network slice (subnet) instance types based on the required management capabilities for the provider and the customer are included here as examples (here the network slice service may be the provision of a Network Slice Instance (NSI) or a Network Slice Subnet Instance (NSSI)). In the following examples, the customer may be a VSP 130, for example, or an MNO 120 receiving a network slice service instance from another MNO.

Type 1: (Only service capability is to be specified): The customer is provided with a fully operational network which provides certain service capability or service instance. Customer does not have to do network management functionalities to use this network slice service as the network topology is transparent to the customer. All of the management functionality required for the network slice service is provided by the provider. The customer may obtain the service related data (e.g. fault or performance data) from the provider.

Type 2: (NF, network topology including network function chains for the service and capacity are provided) NFs and their related capability, network function chains, logical topology, service types, and logical capabilities of the network slice service are provided to the customer. However, the customer is given certain management capability to manage the network to be able to use it for its network slice services. Note that, the provider's management is required to coordinate with TN and other non-3GPP parts. The customer is aware of the topology capacity and can request the specific monitoring information and modification of the service.

Type 3: (Some or all specified NFs and the capacity and/or amount of resources are provided to the customer) NFs are provided with related resource capacity, e.g., capabilities of NFs and capacity of the associated links. However, NF chains are not specified. The customer can deploy multiple services using this network slice service, the topology of which needs to be specified by the customer. For this purpose, the customer should be able to configure the network functions either directly or via the provider's management system. Therefore, the customer should be aware of the internal structure of the slice and needs to be able to use different topologies or NF chains for different services. The provider's management is required to facilitate interactions with TN and managed slice instance operations, such as modifications and performance monitoring.

Type 4: (only Network Functions used for a network slice service(s) are provided) Network functions (NFs) used for the network slice service are provided to the customer without any topology and/or capacity, i.e., without specifying a function chain or link capacities between NFs. Therefore, customer should have the management capability to configure the network to be used for its services. i.e., all phases of slice (subnet) lifecycle, and interactions with TN and other non-3GPP segments. The service types (e.g., Enhanced Mobile Broadband (eMBB), Ultra-Reliable Low Latency Communications (URLLC)) that can be supported to the slice can also be provided to the customer. Although it does not affect the management requirement, it provides more information to the customer about the capabilities of the slice.

FIG. 1 illustrates, in a component diagram, an example of a 5G network environment 100, in accordance with an embodiment of the present invention. There may be multiple players in the 5G network space, such as infrastructure providers (InPs) 110, mobile network operators (MNOs) 120, virtual service providers (VSPs) 130, and end users/devices 140. InPs 110 may be owned by the MNO 120 or by a third party. MNOs 120 provide the network as a service (NaaS) to the customers using the infrastructure provided by the InP 110. VSPs 130 are customers of the MNOs and provide services to the user equipment (UE)/end users/devices 140 via communication connections through the MNO 120 and InP 110. For example, a UE 140 may connect wirelessly with the InP 110, and have a business/authorization relationship with the VSP 130. Examples of VSPs 130 include mobile virtual network operators (MVNOs), safety organizations, vehicle-to-vehicle (V2V) service providers and machine-type communication (MTC) service providers. End users/devices 140 are the end users of the VSPs 130.

In the embodiment of FIG. 1, the 5G network 100 generally comprises an Infrastructure Provider (InP) 110, a Mobile Network Operator (MNO) 120 and a Virtual Service Provider (VSP) 130, which may be a Mobile Virtual Network Operator (MVNO). The InP 110 may provide network infrastructure, which may include virtualized network resources, to the MNO 120. In turn, the MNO 120 may provide virtual network services (such as Network as a Service (NaaS), for example) to the VSP 130, using the infrastructure provided to it by the InP 120. The VSP 130 may provide end-to-end (E2E) communications services to end user's User Equipment (UE) 140 using the virtual network services provided to it by the MNO 120.

The terms "customer service" and "business services" are used in this description to represent the service offered by the MNO 120 to its customer (i.e., VSP 130 or MVNO). Internal representation of the customer or business service is defined as "customer service instance" or "business service instance" and are similar to the term "service instance" in the next generation mobile network (NGMN) fifth generation (5G) White Paper by the NGMN Alliance.

In some embodiments, the terms "customer service instance", "business service instance" and "service instance" may be treated as synonymous, and may be used interchangeably.

One way of providing a service instance to a customer includes using a network slice instance to provide multiple service instances (Scenario 1). Providing multiple service instances using a single network slice is possible according to both NGMN and the 3GPP service and system aspects architecture (SA2) definitions. FIG. 2 illustrates, in a component diagram, another example of the 5G network environment 200. A virtual network customer (i.e., the MVNO 130) obtains a single network slice 210 from the InP 110 (via the operator, i.e., MNO 120) and uses the single network slice to provide two service instances 235 to support two different services using the same slice resources in order to have resource multiplexing gain for the customer (i.e., MVNO 130). FIG. 3 illustrates, in a component diagram, another example of the 5G network environment 300. The network operator (i.e., MNO 120) provides two virtual network (VN) services 235 to two customers (i.e., MVNOs 130) using the same network slice instance 210 so that the operator 120 can get resource multiplexing gain whenever the operator 120 can satisfy the individual service requirements (e.g., when the two customers 130 have similar service requirements). A service 235 may be a voice service, video service, HTML service, or any other VN service that a network operator can provide.

Figure 2A:
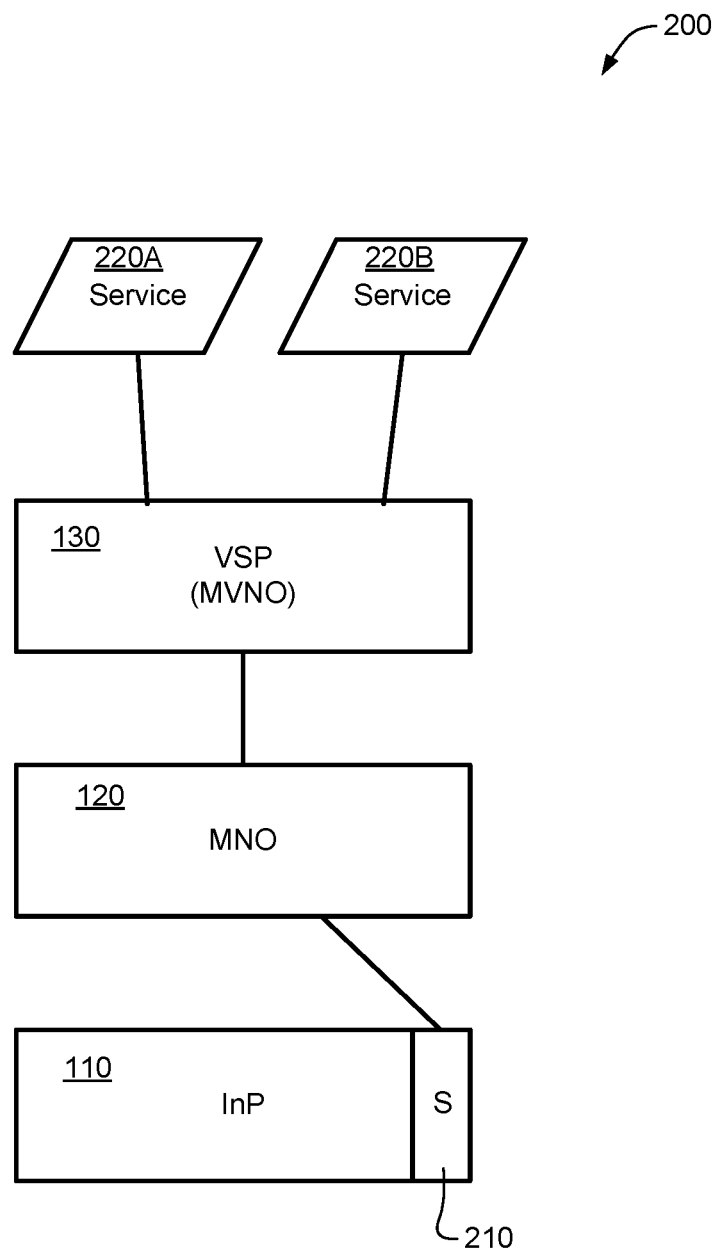
FIG. 2A illustrates, in a component diagram, another example of the 5G network environment.
Figure 2B:
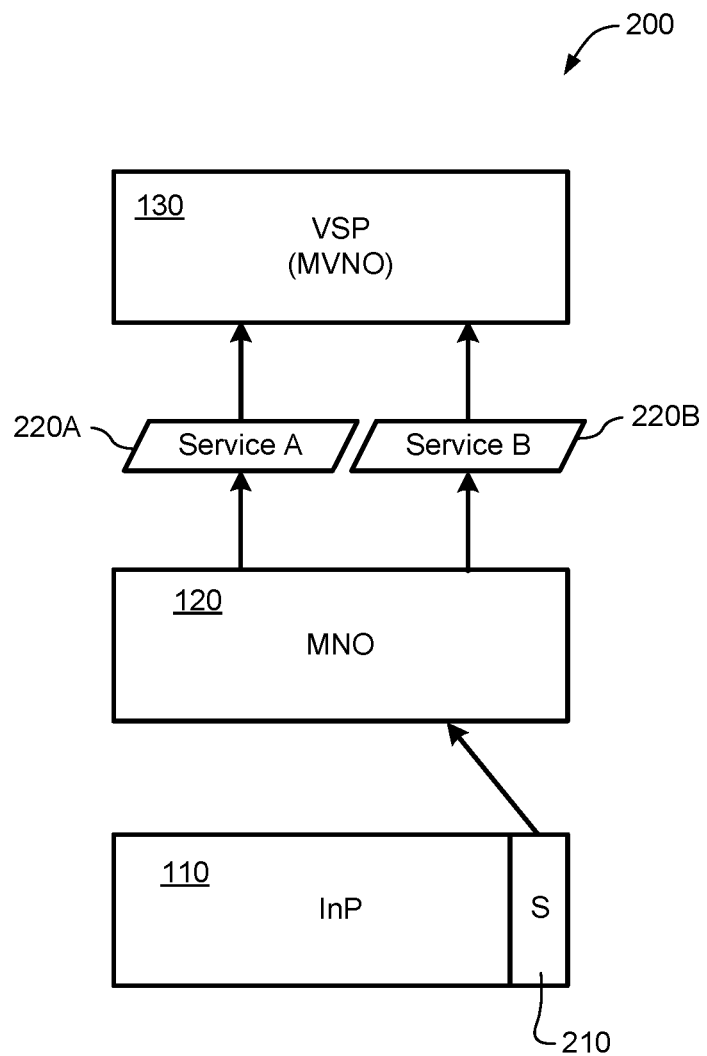
FIG. 2B is a block diagram illustrating an example scenario for providing virtual network services in the 5G network environment of FIG. 1.
Figure 3A:
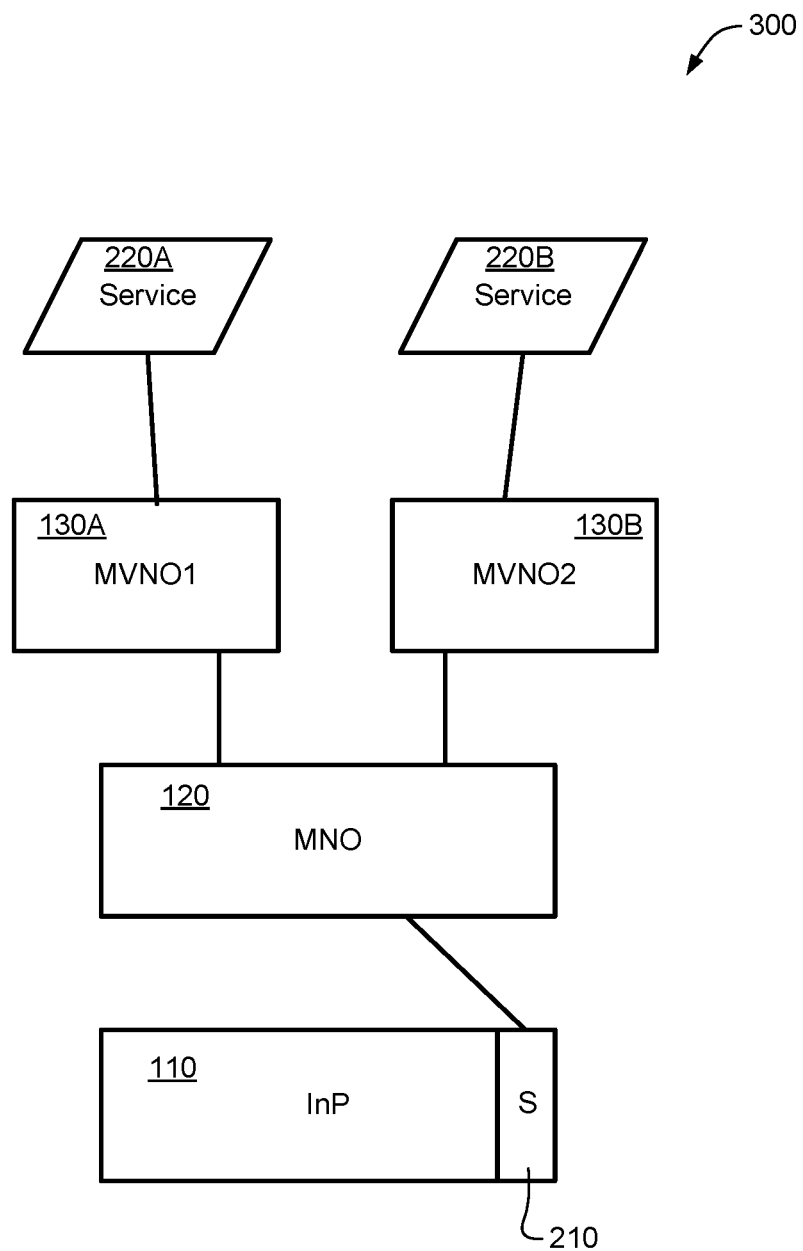
FIG. 3A illustrates, in a component diagram, another example of the 5G network environment.
Figure 3B:
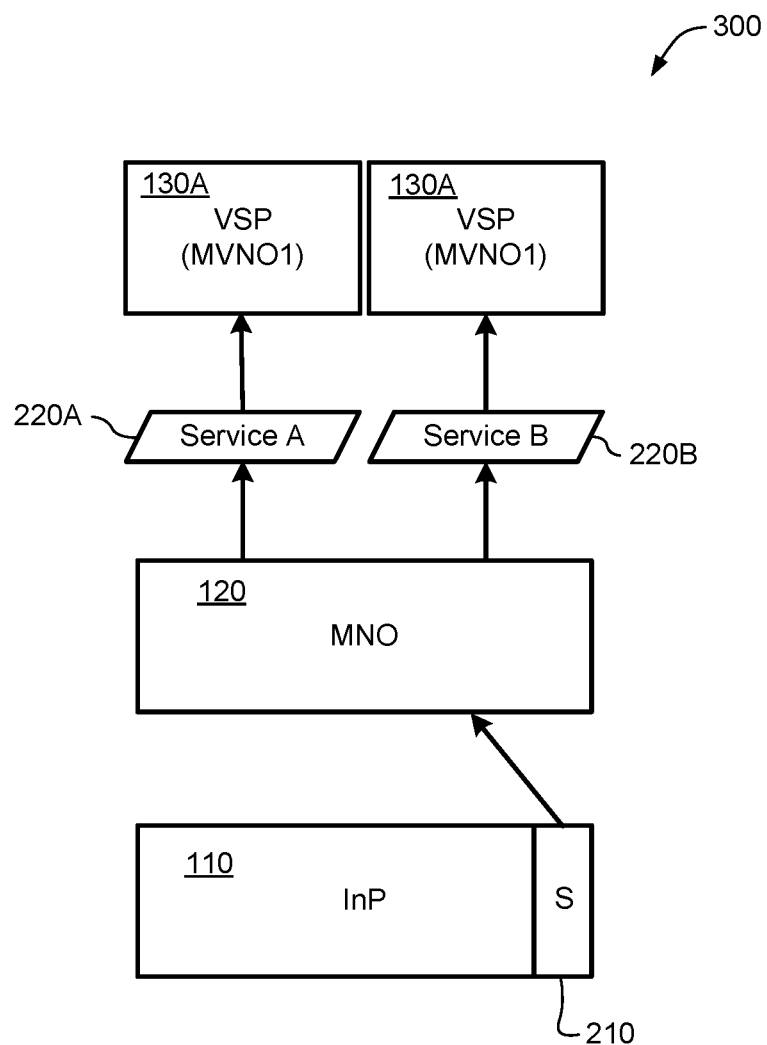
FIG. 3B is a block diagram illustrating another example scenario for providing virtual network services in the 5G network environment of FIG. 1.

FIG. 2B illustrates the arrangement of FIG. 2A with greater clarity. FIG. 2B is a block diagram illustrating an example scenario, in which MNO 120 receives a single slice 210 from an InP 110, and provides two service instances 220A and 220B to its customer (i.e., the VSP 130) using the single network slice 210. This arrangement provides a resource multiplexing gain for the customer 130. FIG. 3B illustrates the arrangement of FIG. 3A with greater clarity. FIG. 3B is a block diagram illustrating a second scenario, in which the network operator (i.e., MNO 120) provides two virtual network (VN) services 220 to two different customers (i.e., MVNO1 130A and MVNO2 130B) using the same network slice instance 210. This arrangement enables the mobile network operator 120 to get resource multiplexing gain whenever the mobile network operator 120 can satisfy the individual service requirements of the involved MVNOs 130A and 130B (e.g., when the two customers 130 have similar service requirements). A service 220 may be a voice service, video service, HTML service, or any other VN service that a network operator 120 can provide.

Another way of providing a service instance to a customer includes using a network slice instance to provide a single service instance (Scenario 2). FIG. 4 illustrates, in a component diagram, another example of a 5G network environment 400. A Service Level Agreement (SLA) directly maps to a service instance 220 and to a network slice instance 210.

Figure 4A:
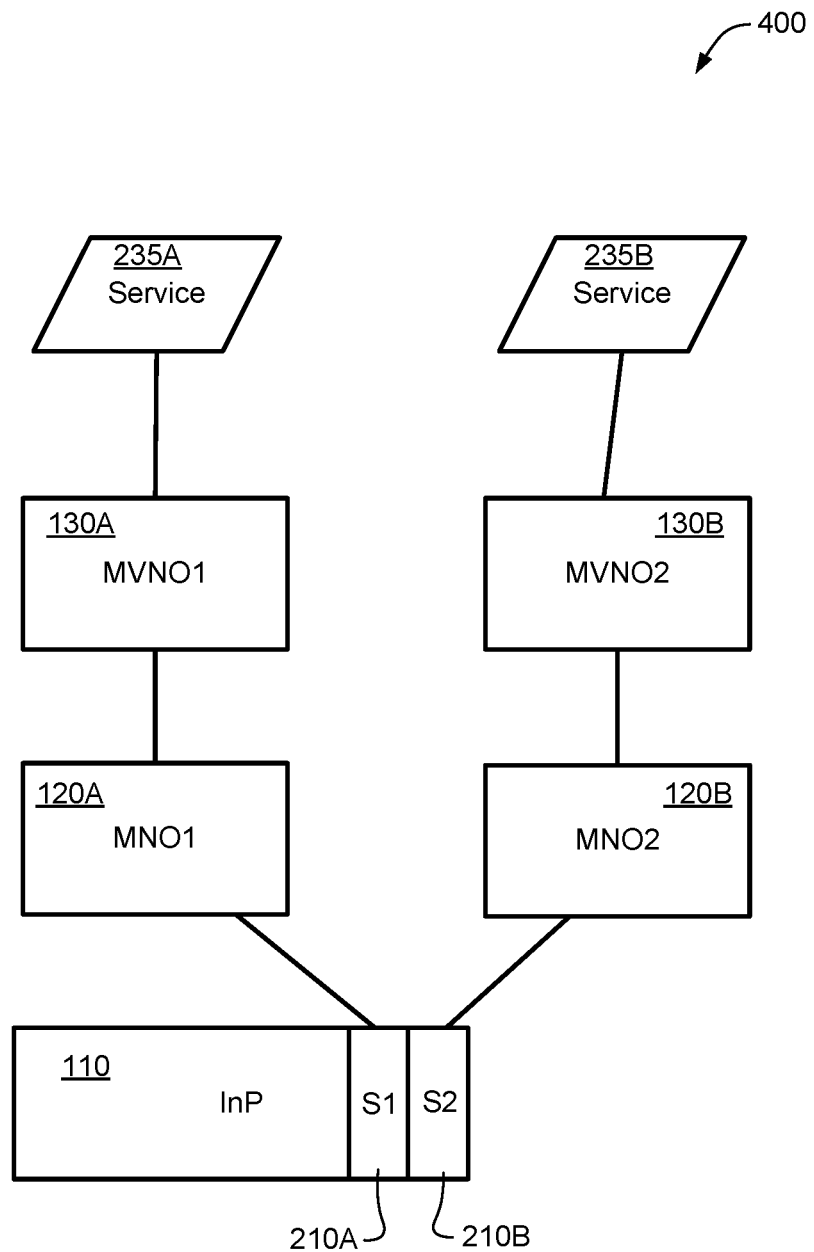
FIG. 4A illustrates, in a component diagram, another example of a 5G network environment.
Figure 4B:
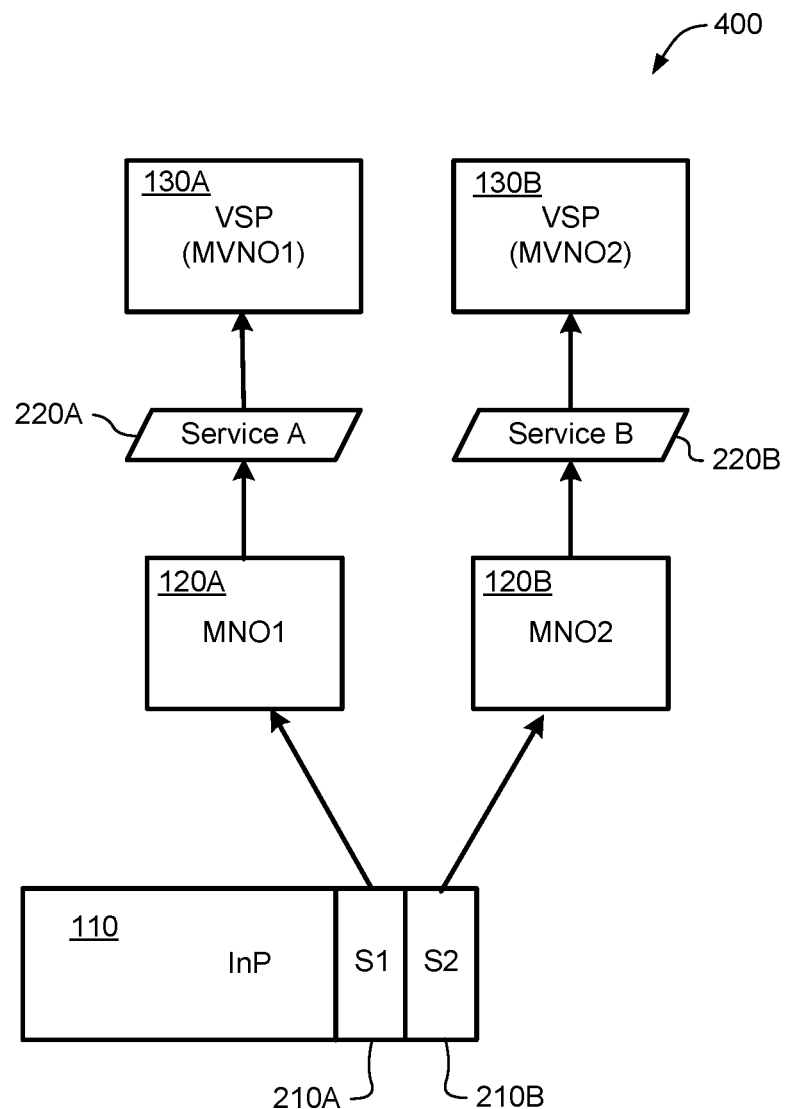
FIG. 4B is a block diagram illustrating another example scenario for providing virtual network services in the 5G network environment of FIG. 1.

FIG. 4B illustrates the arrangement of FIG. 4A with greater clarity. FIG. 4B is a block diagram illustrating the use of a respective network slice instance to support each service instance 220, in which the InP instantiates a pair of slices 210A and 210B, each of which supports a respective service 220 via separate MNOs 120. With this arrangement, a Service Level Agreement (SLA) directly maps to a service instance 220 and to a network slice instance 210.

Figure 5:
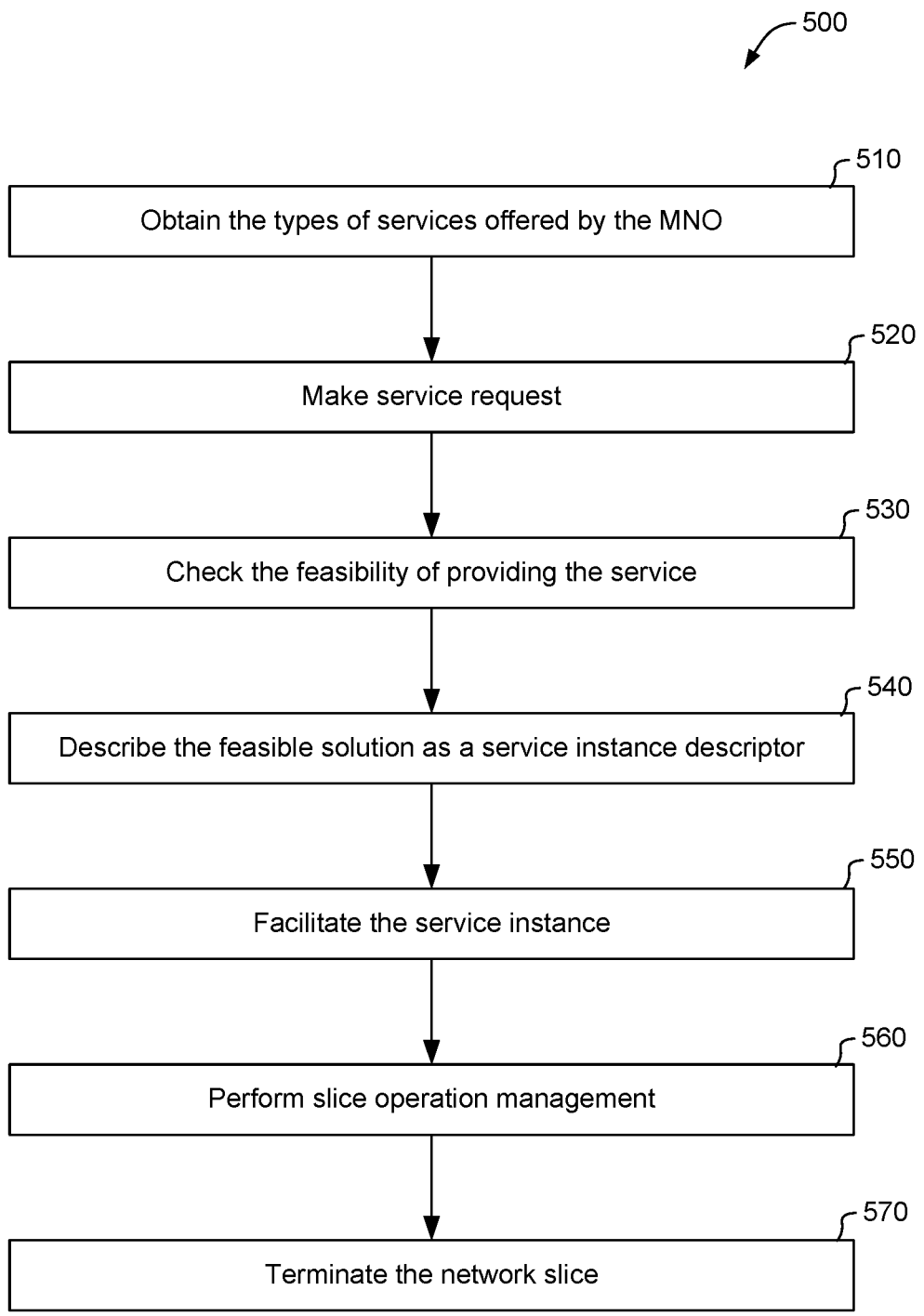
FIG. 5 illustrates, in a flowchart, an example of a lifecycle of providing a virtual network service to a customer.

FIG. 5 is a flowchart 500 illustrating an example of a lifecycle of providing a virtual network service to a customer 130. The method comprises a public/customer 130 obtaining (at 510) the types of services offered by the MNO 120 so that the customer 130 may select the service types they desire. Next, the customer 130 may make a service request (at 520) with the selected service type and specific requirements. The request may also indicate whether the customer 120 wants to use a network slice 210 exclusively for the requested service (that internally reflects as an exclusive network slice instance (NSI)) for security or its own management purposes. If a customer 130 needs multiple services from the same public land mobile network (PLMN), the service request may also indicate whether a single network slice 210 can be used for those services. In this case, the resource usage can be charged for the aggregated service, passing the customer the multiplexing gain (e.g., resource usage) although there can be issues with the performance of individual services unless managed properly. The customer 130 may also request the operator 120 to expose certain aspects of the management and control of the slice 210, if the operator 120 offers such features.

Following receipt of the request from the customer 130, the MNO 120 may check (at 530) the feasibility of providing the requested service and accept, reject or negotiate the service level agreement (SLA) in accordance with the results of the feasibility check. This may include the use of infrastructure of other domains, if needed.

Next, if accepted, a network manager (in the MNO 120) may describe (at 540) the feasible solution as a Service Instance Descriptor (SID) which may also include internal network structure and the work flows to implement them. Next the service instance 220 may be facilitated (at 550). Next, the network management (in the MNO 120, for example) may perform slice specific management tasks (slice operations management) (at 560) used after a slice creation and configuration stage. Next, the network slice 210 is terminated (at 570) by the NM. Other steps may be added to the.

In some embodiments, if the SLA is accepted, a network manager (in the MNO 120, for example) may describe (at 540) the feasible solution as a Business Service Instance Descriptor (BSID) which may also include internal network structures and the work flows to implement them. A service instance 220 may be created (at 550), based on the business service instance descriptor. During subsequent run-time of the service instance 220, the network management (in the MNO 120, for example) may perform slice specific management tasks (e.g. slice operations management) (at 560) used after a slice creation and configuration stage. Finally, the network slice 210 may be terminated (at 570) by the NM. Other steps may be added to the lifecycle 500 as desired Preferably, there may be generic service types defined as globally agreed structures with flexible selection of parameters (i.e., globally agreed service formats, or global customer/business service categorization). A first level service type categorization may include, for example, an end user end-to-end (E2E) service to a user population distributed in a geographical area with specific service function chains and service requirements, specific network topology with capability or/and resource requirements, and specific resources. A second level categorization may include more specific sub-categories for each service type. For example, specific quality of service (QoS) classes in end user E2E service, specific service types (MTC, voice, video streaming, etc.). There may be further categorizations specifying security, priorities, charging policies, authentication, etc.

Steps (510) to (530) in FIG. 5 will now be described in more detail. These steps, (510) to (530), involve customer/business service requests via the customer 130 OSS/BSS interface (in the MNO 120). In order for the customer 130 to select a suitable service type, the Network Operator 120 may publish or inform the service providers 130 about the types of services it offers. This service profile will preferably have some globally agreed service profiles as well as Network Operator proprietary features. Once the customer 130 knows (at 510) the operator service types (510), the customer 130 may choose a service type (520) and make a request to the Network Operator 120. Once the Network Operator 120 receives the service request, it evaluates the possibility (at 530) of providing the service 235, finds different options (e.g., features and associated cost possibilities) and negotiates a service level agreement (SLA) with the customer 130.

In some scenarios, the Network Operator 120 may analyse a received service request and determine that it can provide the requested service using its own resources and/or resources to which it already has access. In such cases, the Network Operator 120 may generate and send an SLA for the requested service to the customer 130.

In some scenarios, the Network Operator 120 may analyse a received service request and determine that it can meet some, but not all of the customer's service requirements using its own resources and/or resources to which it already has access. In such cases, the Network Operator 120 may identify another network operator that can meet at least a portion the requirements of the requested service, and send a request to the other network operator for a second service that provide at least a portion of the customer's service requirements. If the other network operator returns an acceptable SLA, then the Network Operator 120 may send the customer an SLA for the requested service, which the Network Operator 120 may provide to the customer based on a combination of its own resources and the second service provided by the other network operator.

Table 1 shown in FIG. 6 provides an example global customer/business service categorization. Category Level 1 identifies the main categories of possible service types (i.e., customer needs satisfied by service types) offered by an operator, such as connectivity as a service (CaaS), network as a service (NaaS), virtual network functions as a service (VNFaaS), infrastructure as a service (IaaS), etc. Category Level 2 characterizes the services by their topological requirements. A further category level identifies parameters associated with Category Level 2 requirements. In one example, this further category may be divided into Category Level 3 which identifies flow level quality of service (QoS) requirements (i.e., atomic characteristics), and Category Level 4 that provides throughput capability specification parameters. Category Levels 3 and 4 may be interchanged or merged.

Typically, a global customer/business service categorization may have a tree structure or hybrid structure as indicated in Table 1:

Customer service=>type1 (level 1)=>Service type=>Quality type 1 (level 2)=>parameter values.

Table 1 is an example and may be extended to many levels so that a customer 130 can clearly identify their requirement so that the MNO 120 can say whether it can provide the service 235 and, if so, how any financial charging is performed. Other parameters that may be specified (not used in the example in Table 1) in the service types include:
- geographic availability
- end user authentication method, (separate level)
- physical or logical isolation requirements, (separate level)
- congestion control mechanisms, (separate level)
- resource specification, (level 4)
- charging method (separate level)
- dynamic policy change possibilities, (separate level)
- network exposure possibilities, (separate level)
- traffic monitoring and control possibilities for customer, (separate level)
- penalising methods for not meeting the SLA, etc. (together with charging)

Table 2, shown in FIGS. 7A and 7B, provides an example of a four category global business/customer service categorization.

In FIGS. 7A and 7B, The first Business Service Type (ETE service for a customer's end user population) identified in Category Level 1 is an example of Customer Service Category Type (1) described above (Virtual Network with E2E service requirements for a VN customer with its own user/device population). The other Business Service Types identified in Category Level 1 are examples of Customer Service Category Type (2) described above (Virtual Network with a Specific Topology). Category Levels 2-4 identify attributes and/or parameters that may be associated with each Business Service Type.

A customer service request is related to one of the service types in the table and specifies the appropriate service parameters in the service categorization (different open fields as allowed by the operator's service profiles). SLA occurs after a service negotiation and after the MNO 120 determines that it can provide the required service 235 under certain terms. The SLA also has specific attributes related to one of the service categorization or types.

Table 3, shown in FIG. 8, provides an example of a slice/service composition representation at various stages of it's lifecycle.

Referring to FIG. 8, Composition Possibilities A and B are examples of Customer Service Category Type (1) described above (Virtual Network with E2E service requirements for a VN customer with its own user/device population). Thus each of Composition Possibilities A and B include attributes defining Service Functions and Interconnections among Functions, but do not include any attributes related to Internal Network Functions, Network Logical Topology or Transport Protocols.

On the other hand, Composition Possibilities C-H are examples of Customer Service Category Type (2) described above (Virtual Network with a Specific Topology). Thus each of Composition Possibilities C-H include attributes defining Service Functions and Interconnections among Functions, as well as various combination of attributes related to Internal Network Functions, Network Logical Topology or Transport Protocols.

In specific embodiments, Composition Possibility A may correspond with information that an MNO 120 may make accessible to its customers, via either a service profile database or a global business/customer service repository (described below). In such cases Composition Possibility B, may correspond with attributes contained in a request for network slice services received by the MNO 120.

In specific embodiments, Composition Possibility C may correspond with information that an MNO 120 may make accessible to its customers, via either a service profile database or a global business/customer service repository (described below). In such cases Composition Possibility D, may correspond with attributes contained in a request for network slice services received by the MNO 120.

In specific embodiments, Composition Possibility E may correspond with information that an MNO 120 may make accessible to its customers, via either a service profile database or a global business/customer service repository (described below). In such cases Composition Possibility F, may correspond with attributes contained in a request for network slice services received by the MNO 120.

In specific embodiments, Composition Possibilities G and H may correspond with respective different network slice services provided by the MNO 120.

Table 4, shown in FIG. 9, provides an example of a geographical and time traffic demand distribution specification. In the illustrated example, m1 may be the mean number of sessions and v1 may be the standard deviation. This may be replaced by any statistical distribution.

Figure 10A:
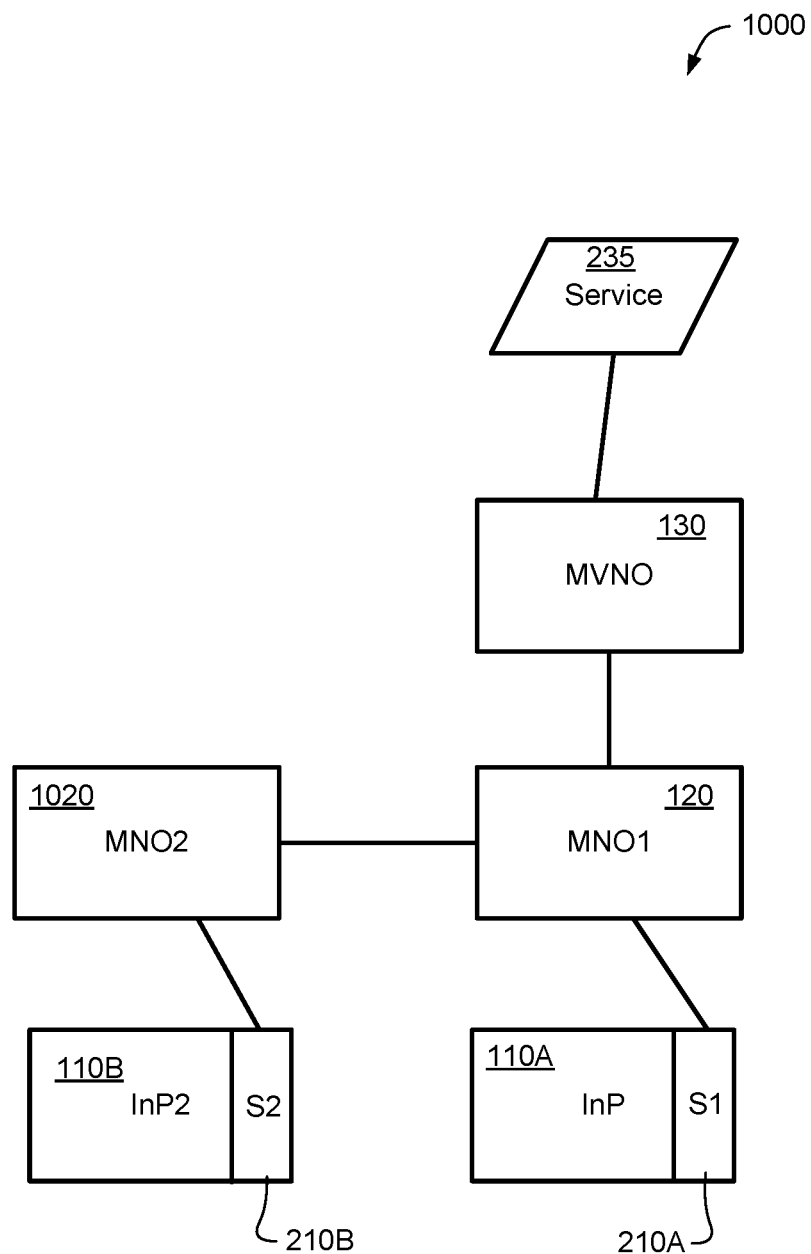
FIG. 10A illustrates, in a component diagram, another example of a 5G network environment.

FIG. 10A illustrates, in a component diagram, another example of a 5G network environment 600. The environment 600 comprises two InPs 110 (InP1 and InP2), two MNOs 120 (MNO1 and MNO2), the MVNO 130 and a service 235. In this example, MNO1 120 may negotiate with MNO2 120 to provide the requested service 235 to MVNO 130. This arrangement may be seamless to the MVNO 130.

Figure 10B:
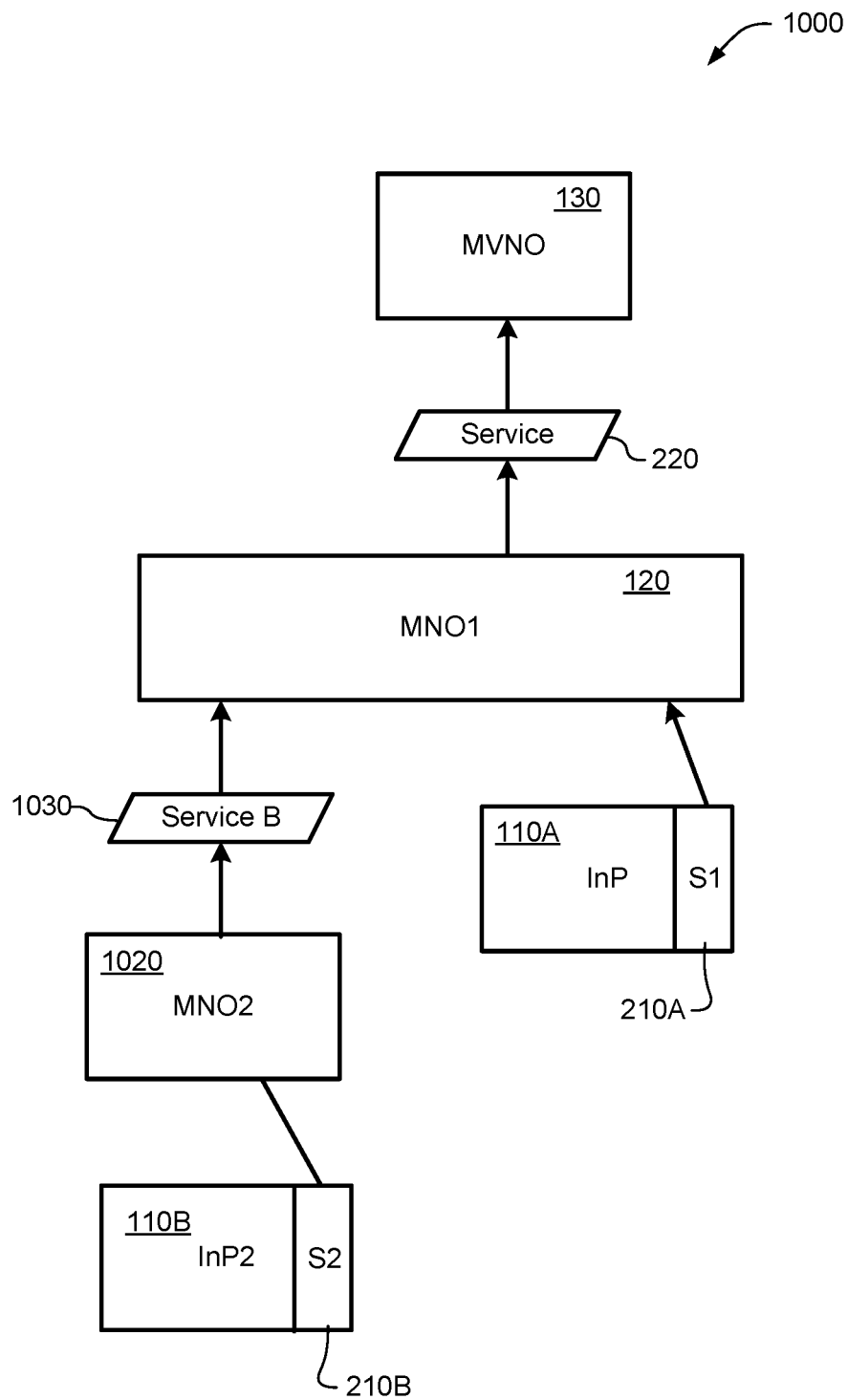
FIG. 10B is a block diagram illustrating another example scenario for providing virtual network services in the 5G network environment of FIG. 1.

FIG. 10B illustrates the scenario of FIG. 10A in greater detail. FIG. 10B is a block diagram illustrating another example scenario 1000 for supporting a virtual network service instance 220 in a 5G network environment. The scenario 1000 uses two InPs 110 (InP1 and InP2), two MNOs (MNO1 120 and MNO2 1020), the MVNO 130 and a service instance 220. In this example, the customer 130 may send a request and obtain a network service instance 220 from MNO1 120, substantially as described above with reference to FIG. 5. However, in the example of FIG. 10B, the MNO1 120 cannot meet all of the service requirements of MVNO 130 from the Network Slice Instance S1 210A. Accordingly, in order to provide the service, MNO1 120 may send a request to MNO2 1020 for a second service instance that meets at least a portion of the service requirements of MVNO 130. Based on this request, MNO1 120 may negotiate an SLA for the second service with MNO2 1020, and subsequently receive network service instance 1030, which (in the illustrated embodiment) is supported by Network Slice Instance 210B provided by InP 110B. MNO1 may then use the network service instance 1030, either alone or in combination with its own resources (such as Network Slice Instance 210A provided by InP 110A) to provide the requested service instance 220 to MVNO 130. This arrangement may be seamless to the MVNO 130.

Figure 11:
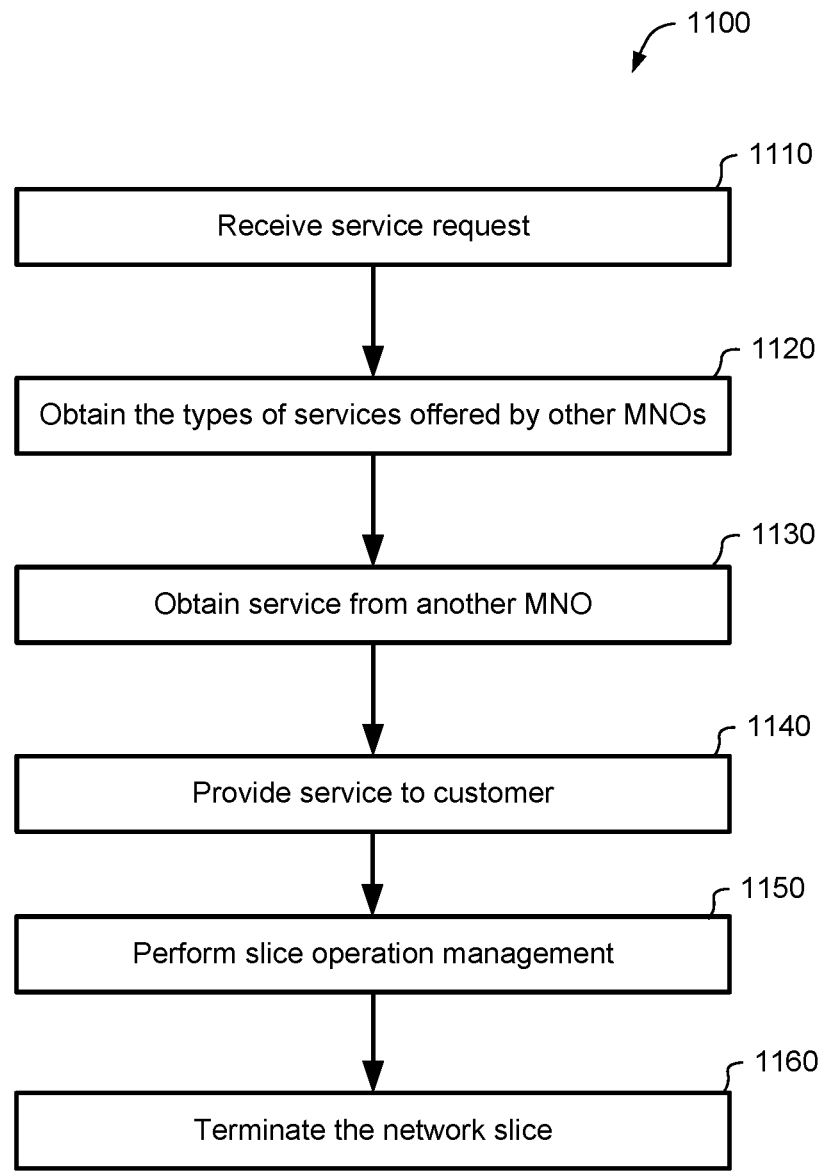
FIG. 11 illustrates, in a flowchart, another example of a lifecycle of providing a virtual network service to a customer.

FIG. 11 illustrates, in a flowchart, another example of a lifecycle of providing a virtual network service to a customer (1100). The method (1100) begins with the customer 130 making a service request (520) with service type and specific requirements to the MNO 120. Next, the MNO obtains the types of services offered (1120) by itself and other MNOs 620 to determine how to best provide the service 235 to the customer 130. Next, steps (530) to (570) in FIG. 5 are performed by either the MNO 120 or by another MNO 620, whichever is managing the service 235. If the MNO 620 is managing the service, then communication between the MNO 620 and customer 130 passes via the MNO 120. Preferably, this is seamless to the customer 120.

In some embodiments, the process of FIG. 11 may be implemented by MNO1 120 to provide network service instance 220 to a customer 130 in the scenario of FIG. 10. The method (1100) begins with the MNO1 120 receiving (at 1110) a service request from the customer 130 with service type and specific requirements. Next, the MNO1 120 obtains (at 1120) the types of services offered by other MNOs and uses this information along with its own service types to determine how to best provide the service requested by the customer 130. If the MNO 120 determines that network services 1030 of MNO2 1020, for example, should be used, then MNO1 120 may request and obtain (at 1130) such network services 1030 from MNO2 1020. In some embodiments, MNO 1020 may follow steps 510-550 of the process described above with reference to FIG. 5 to provide network service instance 1030 to MNO1 120. Similarly, MNO1 120 may follow steps 510-550 of the process described above with reference to FIG. 5 to describe the feasible solution as a service instance descriptor (which in this case may include information of the network service instance 1030 provided by MNO2 1020) create the network service instance (NSI) 220, and provide (at 1140) the network service instance 220 to the customer 130. During subsequent run-time of the network service instance 220, either one or both of the MNO1 120 and MNO2 1020 may perform (at 1150) slice specific management tasks (e.g. slice operations management) in respect of its own slice 210. If the MNO2 1020 is managing any part of the service instance 220, then communication between MNO2 1020 and customer 130 passes via MNO1 120. Preferably, this is seamless to the customer 120.

As may be appreciated, the method described above with reference to FIG. 11 may be hierarchical, in that MNO2 1020 may use the same process as described above to request network services from another MNO, and include the network services obtain from such other MNO in its own network service instance 1030 provided to MNO1 120.

Figure 12A:
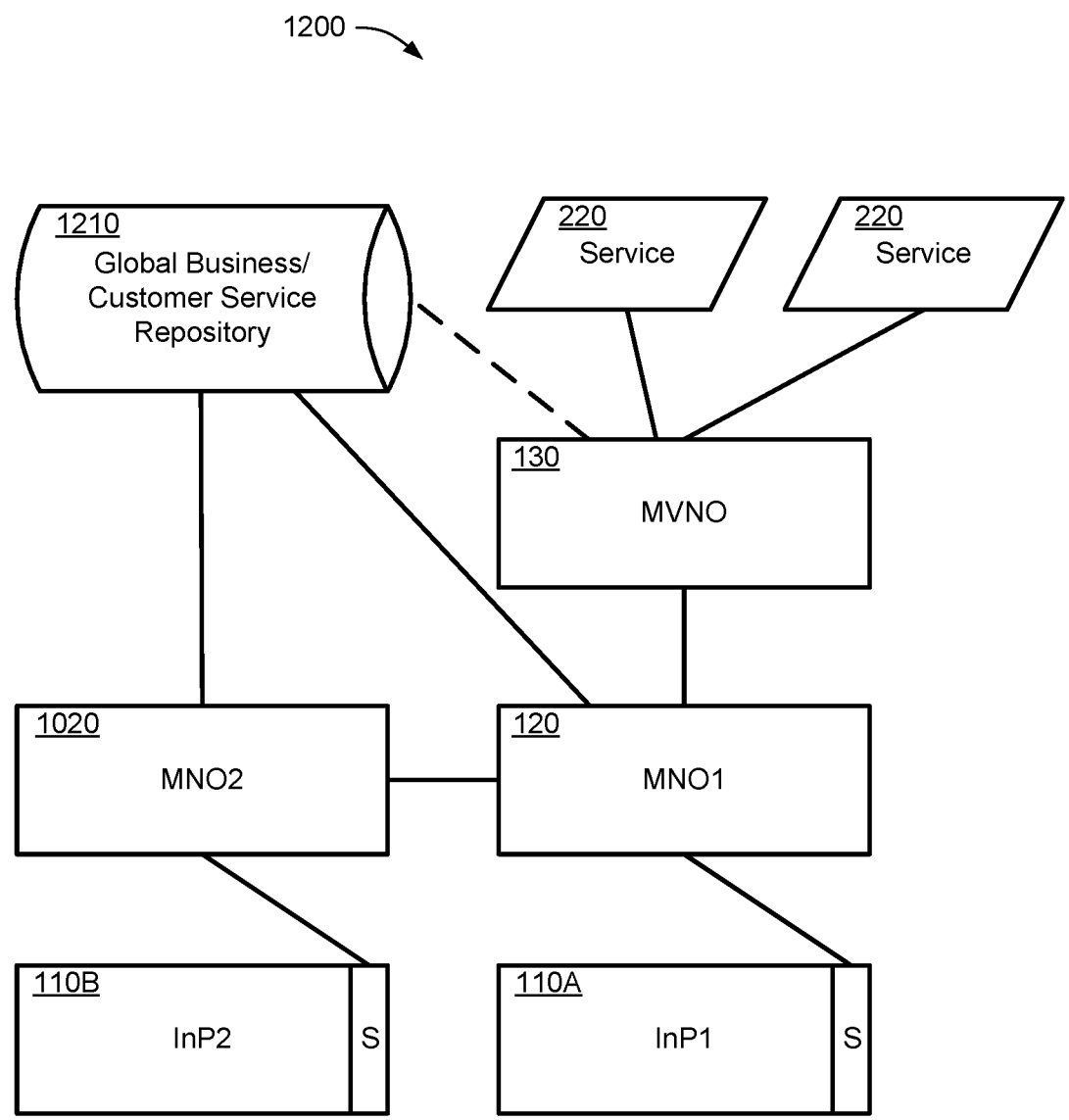
FIG. 12A illustrates, in a component diagram, another example of a 5G network environment.

FIG. 12A illustrates, in a component diagram, another example of a 5G network environment. The environment comprises the MVNO 130, MNOs 120, InPs 110, services 220 and a global business/customer service repository 1210. The MVNO 130 may optionally communicate with the global business/customer service repository 1210 to determine which MNOs 120 have services that the MVNO 130 desires. Alternatively, the MVNO 130 may simply request a service from an MNO 120 and if the MNO 120 cannot provide the requested service, then the MNO 120 communicate searches the global business/customer service repository 1210 to determine if another MNO 1020 can provide the requested service. The global business/customer service repository 1210 may be an operator's 120 service profile database which includes its services in a globally accepted/standardized format (each operator may have its own database accessible to public or specific customers). Alternatively, the global business/customer service repository 1210 may include service profiles (in a globally acceptable format) of multiple operators (i.e., all operators in a region/country/world, etc.).

Figure 12B:
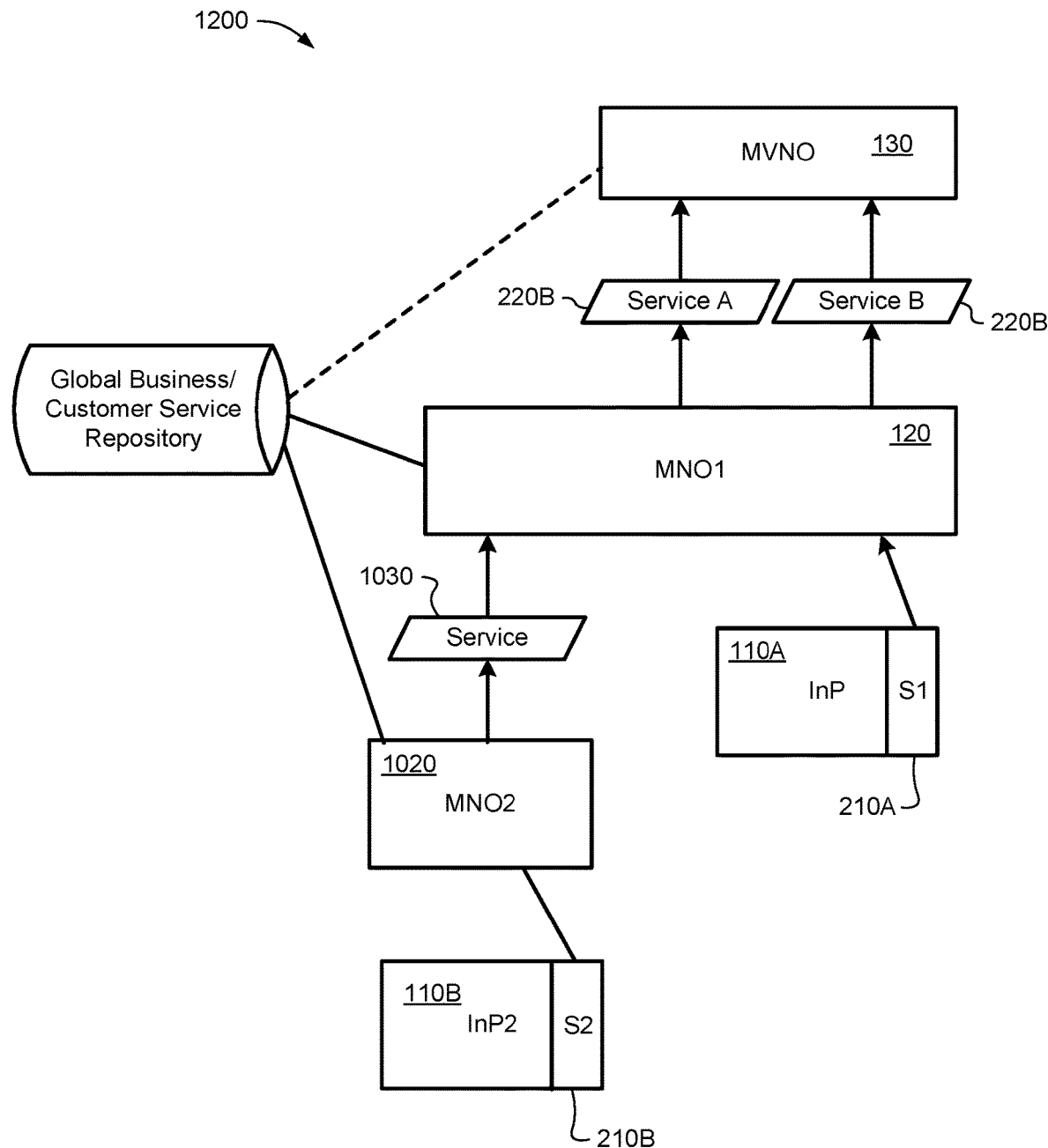
FIG. 12B is a block diagram illustrating another example scenario for providing virtual network services

FIG. 12B is a block diagram illustrating the example scenario 1200 of FIG. 12A with greater clarity. The example of FIGS. 12A and 12B utilize the MVNO 130, MNO1 120, MNO2 1020, InPs 110, services 220 closely similar to those described above with reference to FIGS. 10 and 11, along with a global business/customer service repository 1210. The MVNO 130 may optionally communicate with the global business/customer service repository 1210 to determine which MNOs 120 have services that the MVNO 130 desires. Alternatively, the MVNO 130 may simply request a service from MNO1 120 and if the MNO1 120 cannot provide the requested service, then the MNO1 120 may search the global business/customer service repository 1210 to determine if another MNO, such as MNO2 1020 can provide the requested service. The global business/customer service repository 1210 may be a network operator's 120 service profile database, which may include its services in a globally accepted/standardized format. In some embodiments, each network operator 120 may have its own service profile database, which may be accessible to the public or specific customers. Alternatively, the global business/customer service repository 1210 may include service profiles (in a globally acceptable format) of multiple operators 120. For example, the global business/customer service repository 1210 may include service profiles of all operators in a given region/country/world, etc.).

Figure 13:
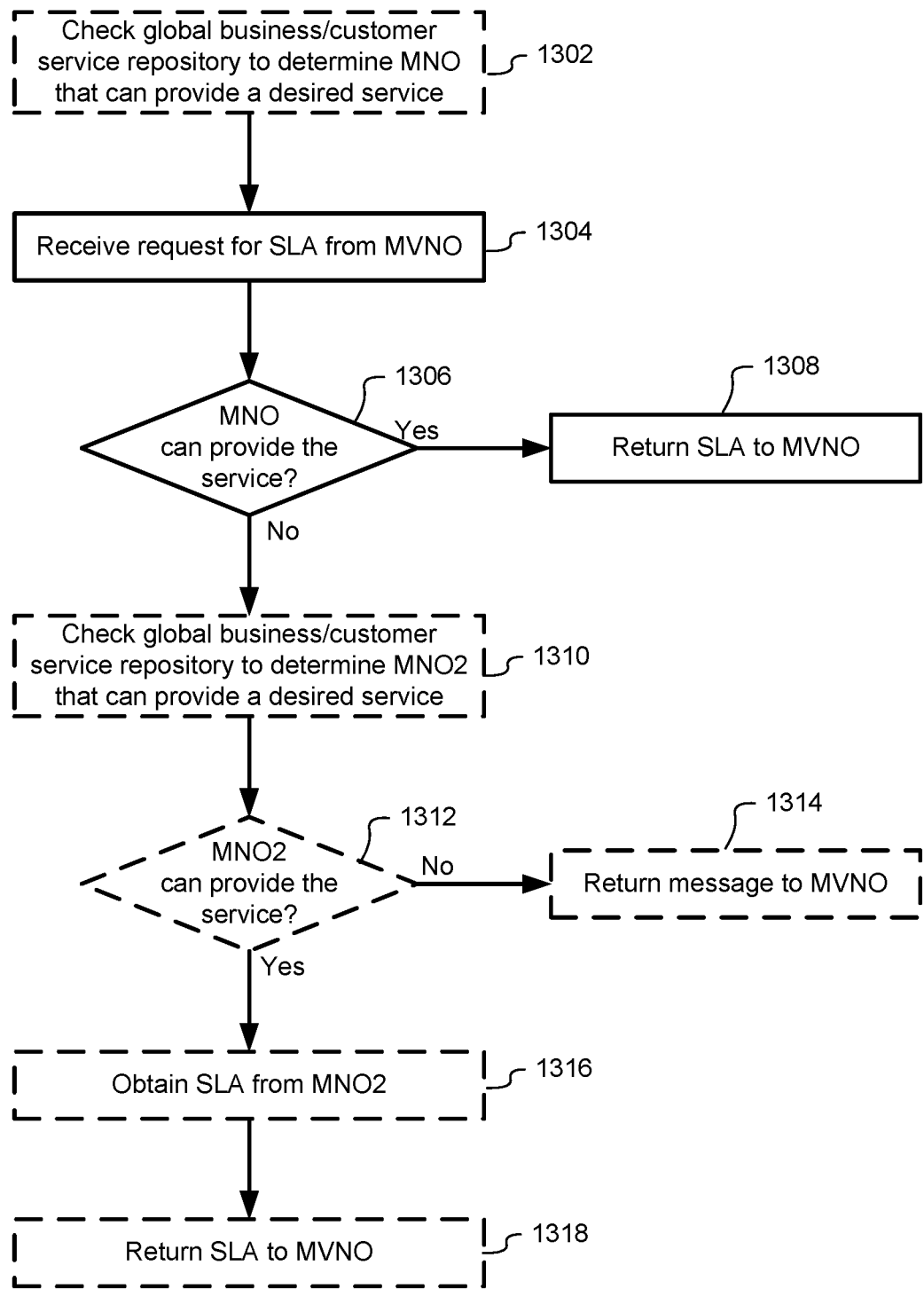
FIG. 13 illustrates, in a flowchart, an example of a method of requesting a service.

FIG. 13 illustrates, in a flowchart, an example of a method of requesting a service. A customer (i.e., MVNO 130) optionally checks (at 1302) the global business/customer service repository 1210 to determine an MNO1 120 that can provide a desired service. The MVNO 130 requests a SLA for the service from the MNO1 120. If the MNO1 120 can provide the requested service, then the MNO1 120 returns (at 1308) an SLA for the requested service to the MVNO 130. Optionally, if the MNO1 120 cannot provide the requested service, then the MNO1 120 checks (at 1310) the global business/customer service repository 1210 to determine another MNO2 1020 that can provide the requested service. If the MNO2 1020 can provide the requested service (at 1312), then the MNO1 120 obtains (at 1316) an SLA for the service from the MNO2 1020. As such, an operator 120 may negotiate with other operators 1020 for the provision of network slice services. The MNO1 120 forwards the SLA (at 1318) to the MVNO 130. If the MNO2 cannot provide the requested service (at 1312), then the MNO1 120 returns (at 1314) an appropriate message to the MVNO 130.

Figure 14:
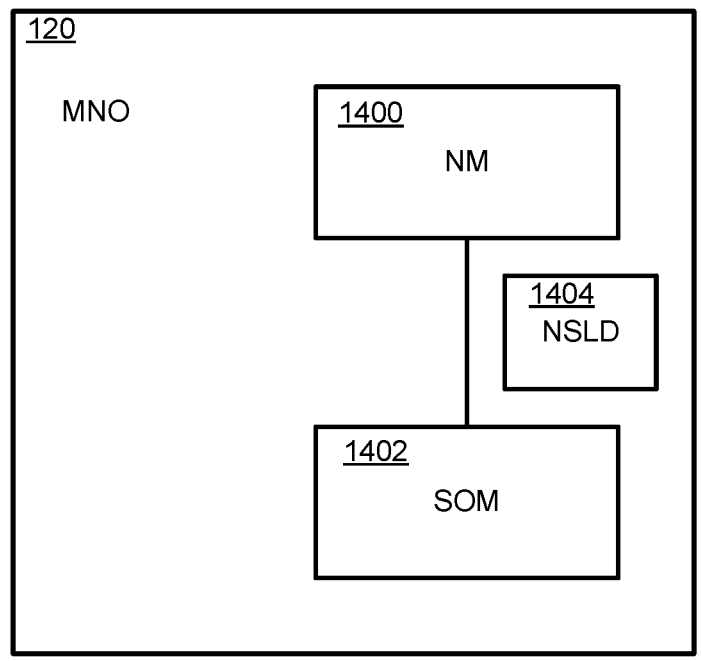
FIG. 14 illustrates, in a component diagram, an example of a MNO.

Step (540) in FIG. 5 will now be described in more detail. The step (540) involves the generation of a network slice instance. A network manager (NM) in a MNO 120 may describe a feasible solution to a service request (540) as a business/customer service instance descriptor (BSLD) which may also include internal network structure and the work flows to implement them. FIG. 14 illustrates, in a component diagram, an example of a MNO 120. The MNO 120 comprises a network manager (NM) 1400 and a slice operation manager (SOM) 1402 that communicates with the NM 1400. The NM 1400 generates a network slice instance descriptor (NSID) 1404 and passes the NSID 1404 to the slice operation manager 1402.

A NM 1400 entity may keep a network slice template (NST) to create multiple network slice instances (NSIs) with similar characteristics. When creating a NSI, the NM 1400 checks the availability of a matching NST. If available, the NM 1400 will add parameter values and work flows to it to create an instance of the slice. Different or similar values may be added to create different network slice instances. A full description of the final NSI (with values and work flows) is termed a network slice descriptor (NSID).

A business service instance (BSI) is similarly created using a business service template (BST) or object class which keeps the composition and characteristics of the BSI. The BST may have a similar structure as a NST. Because a NSID is derived from a NST by adding the parameter values and work flows to an NST, an NSID would reflect the NST composition when the parameter values and the work flows are taken away from the NSID. Therefore, a detailed description will be provided below for only the NSID structure. Similarly, a business service instance descriptor (BSID) is created using the BST/NST by adding parameter values and work flows to the BST.

In some embodiments, Network Component information such as available NFs or NF chains, is not available to the service level management entities. In such cases, only parts of the NST structure may be included in the BST, and in some cases the BST may only define service requirements with no network component related specifications.

Figure 15:
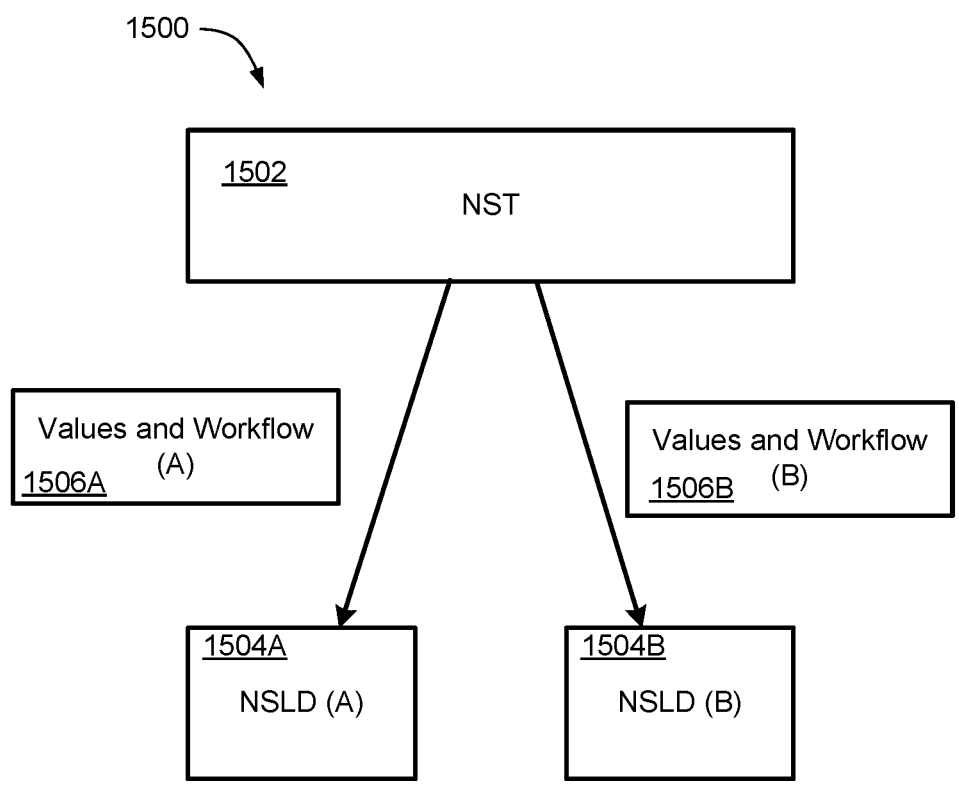
FIG. 15 illustrates, in a component diagram, an example of a network slice instance descriptor (NSID) environment.

FIG. 15 illustrates, in a component diagram, an example of a network slice instance descriptor (NSID) environment 1500. A network slice template (NST) (Object Class) 1502 is an object class that may be used to create a network slice instance that captures the network composition and characteristics of the services that can be provided using the NSI. It may include service/network function chains for the services, QoS specifications, authentication techniques, policies, etc. When a single business service instance is to be served by a NSI, the associated NST may be the same as the BST.

A network slice instance descriptor 1504 may be created by including specific parameter values and work flows 1506 to the NST 1502. Multiple business service instances (BSIs) provided by a single NSI may be described using a special class of NSTs called a sharable NST. A sharable NST (SNST) describes the attributes of each business service instance (BSI) in addition to other components. For this purpose, the SNST may refer to a BST (since BST has the same structure as a NST this means it refers to another NST). Therefore, a sharable NST may refer to a BST/NST for each business service.

Sometimes, a NSI may serve multiple BSIs of the same type (with same BST). This may be specified by including the number of BSIs attribute for each BST in the NST. Therefore, for each BST included in a NST, a corresponding number of BSI parameter may be specified. Sometimes, network slices may use subnetworks. In terms of composition, a subnetwork template may be similar to a network slice template. Therefore, a subnetwork template (sub-NST) may have a similar structure as a NST with additional attributes to indicate the sharability of a subnetwork across multiple slices. Details of an NST may be derived from the NSID description by removing the parameter values and the specified work flows. The following are some example NST, SNST, structures.

(not shared) NST1–Global slice characteristics+{
   Attributes}
SNST1–Global service/slice characteristics+{
   BST1 (this may refer to a NST)
   an attribute to represent the number of BST1 instances
   BST2 (This may refer to a NST)
   an attribute to represent the number of BST2 instances
   Attributes for common BST parameters (e.g., common NF chain for all the flows)
   Attributes for aggregated BST parameters (e.g., total capacity)}
SNST2–{
   BST1
   attribute for the number of BST1s
   BST2
   an attribute for the number of BST2s}

A business service instance descriptor (BSID) is an internal structure of an operator. This is defined after the determination of network design for a given service which includes the identification of a NS blueprint and the values. This descriptor has similar format as the network slice instance descriptor (NSID). However, as indicated below, the network slice instance descriptor (NSID) includes service instances that are supported by the NSID when multiple services are supported by the NSID, while the service instance descriptor does not need such description. If the service instance is to be included into an existing network slice instance, the network slice instance may be modified by the NM 120 and the service instance descriptor is sent to the network slice instance manager with the modified information. If the business service instance (BSI) is to be included into a new network slice instance, the BSI is created with a network slice instance manager and the network slice descriptor may be the same as the business service instance descriptor.

A network slice instance descriptor (NSID) is a network composition description to meet all SLA's supported by the NSID and corresponds to a network slice template with parameters to meet all service requirements. The following descriptions are provided for a non-shared NSID. The extension to a shared NSID may be derived from shared NST (SNST) described before, e.g., for a shared NSID this may include all the BSTs with their parameter values and work flows for each BST the shared NST has included.

- Included Business Service Instances and their descriptions (parameterized as mentioned above).
- Some network segments may belong to different administrative domains.
- Network function chains, PoPs, resources:
  - For some cases, only a network function chains may be defined; for others, a complete network topology for each flow types may be defined;
  - Table 3, above, illustrates some possibilities.
  - Identification of each VNF to instantiate, where to find them, and what parameters to configure them with, order of instantiation, condition of instantiation, etc. (e.g. wait for VNF1 to trigger event X and boot VNF2)
- Inter-Domain (e.g. RAN/CORE) interaction
  - Points of up-link entry to be added to the Network Slice Selector Function
  - The slice control-plane nodes which receives the RAN's point of entry IPs or Tunnels encapsulation to use
  - P-GWs IPs to connect to the Internet or other Operator's network.
- The NSI may include subnetwork descriptions, including subnetwork abstraction parameters. In the case of a controllable sub-NST, a complete description of the subnetwork similar to a NSID may be included. This may also include the information about the NSIs that share the subnetwork instance, if applicable.
- When multiple administrative domains are included (e.g., as borrowed resources or subnetworks), the abstracted information may be included as capabilities or subnetwork instance descriptors similar to NSID.
- Maximum resource requirements for NFs, subnetworks, for different time periods
  - Include logical link capacities
  - computing capabilities (flops/memory/packets per sc processing/packet sizes (MTU), burst requirements)
  - Key performance indicators (KPIs), including network KPIs and user KPIs. A KPI may relate to time and virtual or geographical regions.
  - This may be indicated separately for each business service instance to be included in the slice, if such resource assignment is done.
  - It can also include the aggregated resource requirements and management requirements (PN, FM etc.), for a group of business service instances.
- Specific QoS/QoE and other capability requirements (for each business service)
  - Latency requirements in between each NF and total average maximum latency (end to end)
  - Maximum dropped packet requirements (how many nines of reliability)
  - GBR per PDU session, maximum burst per session, max number of sessions, aggregated maximum burst rate to support to all sessions in slice.
  - QoS profiles and QoS indicator mapping to provide and interact across different administrative domains (e.g. between CN and RAN, CN connecting with multiple RANs, etc).

Also the following aspects for each business service, or as a common attribute or as an aggregated attribute:
- Network exposure level and method
- End user authentication method
- Charging method
- Accounting requirements, etc.
- Congestion control mechanisms,
- Dynamic policy change method if applicable
- Traffic monitoring and control possibilities for customer,
- Penalising methods for not meeting the SLA, etc.

The following is an example of attributes for different slice/service representations:
- Network Capability Types
  - Type A, B or C Possibilities
- SLA Attributes (External)
  - Network KPI for its network.
  - Application/flow requirements (e.g., QoE) including service functions/graphs
  - Penalties.
  - User/Traffic demand distribution (time/geographical)
  - Charging methods
  - End user AA methods
- Network Slice Templates (Internal)
  - (Object Class—Definition of Slice)
  - NF graphs for different service flows (not a logical topology with POPs)
  - Work flows
  - QoS/QoE requirement classes
  - AAA requirements, etc.
  - Multiple 3GPP services allowed?
- VN Service Instance Parameter values
  - Used to create the descriptor from template
- VN Service Instance Descriptor
  - Is a network composition description to meet SLA (internal) and corresponds to a network slice template with parameters to meet service requirements?
  - NF graphs for different service flows
  - Maximum resource requirements for different time periods
  - Accounting requirements
  - Exposed to customer if Type B
- VN Service Instance
  - Part of the run-time NSI where the part described by the VN service instance descriptor
- Network Slice Instance Parameter values
  - Used to create the NSI descriptor from template
- Network Slice Instance Descriptor
  - Is a network composition description to meet all SLA's supported by it (internal) and corresponds to a network slice template with parameters to meet all service requirements?
  - Specific QoS/QoE requirements
  - NFs and maximum resource requirements for different time periods
  - Included VN Service Instances and their descriptions (parameterized)
  - Accounting requirements, etc.
- Network Slice Instance (NSI)
  - Run time entity with instantiated NFs at PoPs with location and a network topology which facilitates the individual VN Service Instance requirements Steps (550) to (560) in FIG. 5 will now be described in more detail. The steps (550) to (560) involve the facilitation of a network slice service.

Figure 16:
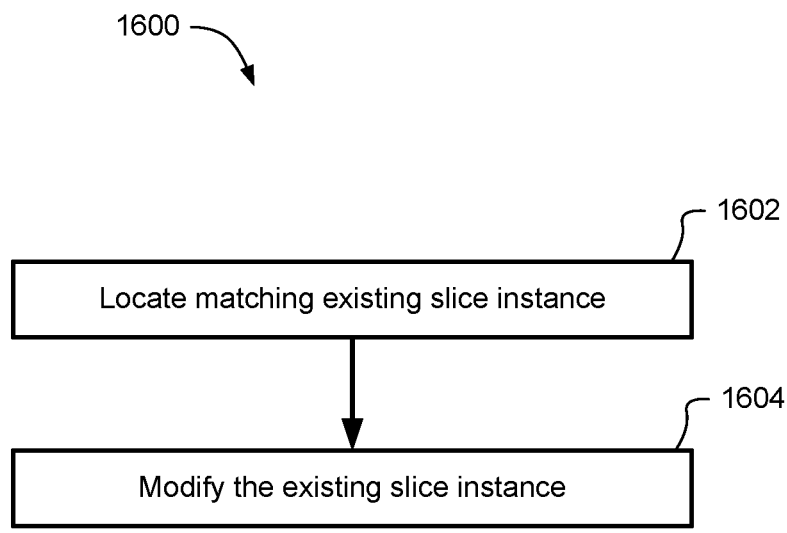
FIG. 16 illustrates, in a flow chart, an example of a method of adding a new service to an existing network slice.

In the scenario described above with reference to FIG. 2, the customer (130) may be included into an existing network slice instance. The MNO 120 may include a new service to an existing network slice instance, if the inclusion is an option (i.e., either customer 130 request the inclusion or the operator 120 decided to include the service as the modified network slice would still meet the service requirements). FIG. 16 illustrates, in a flow chart, an example of a method 1600 of adding a new service to an existing network slice. A matching existing slice instance is located (1602). The existing slice instance is modified (at 1604) to accommodate the new customer service instance. This step (1604) may include changing the configuration of the slice instance to include the new service (which may increase allocated resources or the network capabilities), and modifying the network slice instance descriptor (NSID). Whenever any of the service instances in a NSI are to be modified or terminated, the NSI may also be modified with the NSID.

In the scenario described above with reference to FIG. 4, the customer 130 may exclusively use a network slice instance. The NM 120, first checks the availability of a mapping network slice blueprint (Network Slice Object Class). If a matching blueprint is not available, it may create a new blueprint and instantiate a new network slice instance. Once the blueprint is identified, the NM may create a network slice instance descriptor which can satisfy the service requirements by adding slice instance specific parameters to the blueprint. The NM may create the network slice instance by deploying and configuring the subnetworks, NFs, storage and other resources.

Step 560 in FIG. 5, above, involves the NM performing slice specific management tasks (Slice Operations management) that may be used after the slice creation and configuration stage. The NM 120 may create a separate management entity, e.g., slice operations manager (SOM) 1402 to do these tasks for management isolation. As discussed above, a separate slice instance specific management entity may be useful when the customer is allowed to carry out certain management tasks. The slice specific management tasks may include slice instantiation/termination functions, a slice specific management coordination function, other function such as slice scaling functions, and configuration parameter modification functions.

Slice instantiation/termination functions may also be performed by the NM 120 and handover the next steps of LCM to the SOM 1402. If instantiation and termination are done by the NM 120, the NM 120 has more control of the network and has overall control across slice instances. But the NM 120 may also request the SOM 1402 to do this by passing the NSID to the SOM 1402. In that case, the SOM 1402 should inform the NM 120 about the state of the slice instance as required (e.g. after successful instantiation or termination) of the slice instance when carry out such tasks. Therefore, for some slices (fully independently controlled) this may be done by the SOM 1402 while for others this may be done by the NM 120.

The coordination function may coordinate the slice specific management across different domains used by the slice.

Other functions may be included, such as slice scaling functions, slice modifications, fault management, slice performance evaluations and change requests to the NM, individual service instance inclusion, termination and modifications and their performance management, etc. These other functions may be specific to the slice and may be handled independently from the other slices within the boundaries specified by the NM for a slice.

Changes to the configuration parameter ranges may be requested from the NM. The management may specify boundaries and the SOM may work on those boundaries. For efficient resource usage, temporary release of the resources may be informed to the NM to be used by other slices for certain durations or on the condition that they may be obtained back after a request is made within a certain time.

Slice termination (570) may be performed by the NM after a slice operations manager request or as a result of a customer request.

Figure 17:
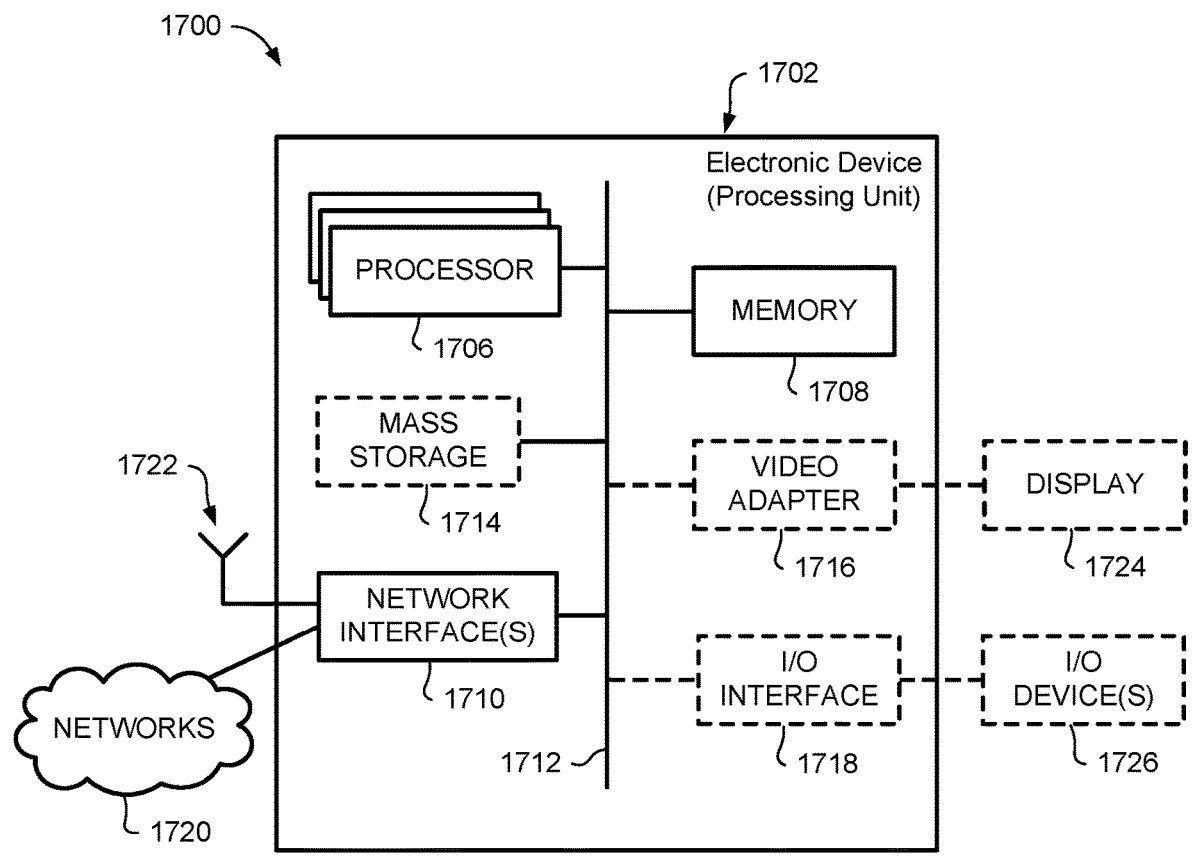
FIG. 17 illustrates, in a block diagram, a computing system that may be used for implementing the devices and methods disclosed herein.

FIG. 17 illustrates, in a block diagram, a computing system 1700 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1706, a memory 1708, and may further include a mass storage device 1714, a video adapter 1716, and an I/O interface 1718 connected to a bus 1712.

In some embodiments, the processing unit 1702 may be provided as an Electronic Device (ED). In some embodiments, the processing unit 1702 may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the processing unit 1702 may be a device that connects to network infrastructure over a radio interface, such as a mobile phone, smart phone or other such device that may be classified as a User Equipment (UE). In some embodiments, processing unit 1702 may be a Machine Type Communications (MTC) device (also referred to as a machine-to-machine (m2m) device), or another such device that may be categorized as a UE despite not providing a direct service to a user. In some references, processing unit 1702 may also be referred to as a mobile device (MD), a term intended to reflect devices that connect to mobile network, regardless of whether the device itself is designed for, or capable of, mobility.

The bus 1712 may be one or more of any type of several bus architectures including a memory bus or memory controller, a peripheral bus, or a video bus. The CPU 1314 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. The memory 1708 may include ROM for use at boot-up, and DRAM for program and data storage for use while executing programs.

The mass storage 1714 may comprise any type of non-transitory storage device configured to store data, programs, and other information and to make the data, programs, and other information accessible via the bus 1712. The mass storage 1714 may comprise, for example, one or more of a solid state drive, hard disk drive, a magnetic disk drive, or an optical disk drive.

In some embodiments, mass storage 1714 may be remote to the electronic device 1702 and accessible through use of a network interface such as interface 1710. In the illustrated embodiment, mass storage 1714 is distinct from memory 1708 where it is included, and may generally perform storage tasks compatible with higher latency, but may generally provide lesser or no volatility. In some embodiments, mass storage 1714 may be integrated with a memory 1708 to form an heterogeneous memory.

The video adapter 1716 and the I/O interface 1718 provide interfaces to couple external input and output devices to the processing unit 1702. As illustrated, examples of input and output devices include a display 1724 coupled to the video adapter 1716 and I/O devices 1726 such as a mouse/keyboard/printer coupled to the I/O interface 1718. Other devices may be coupled to the processing unit 1702, and additional or fewer interface cards may be utilized. For example, a serial interface such as universal serial bus (USB) (not shown) may be used to provide an interface for an external device.

Those skilled in the art will appreciate that in embodiments in which processing unit 1702 is part of a data center, I/O interface 1718 and Video Adapter 1716 may be virtualized and provided through a network interface 1710.

The processing unit 1702 also includes one or more network interfaces 1710, which may comprise wired links, such as an Ethernet cable, and/or wireless links to access nodes or different networks. The network interfaces 1710 allow the processing unit 1702 to communicate with remote units via the networks 1720. For example, the network interfaces 1710 may provide wireless communication via one or more transmitters/transmit antennas 1722 and one or more receivers/receive antennas. The processing unit 1702 may be coupled to a local-area network 1720 or a wide-area network for data processing and communications with remote devices, such as other processing units, the Internet, or remote storage facilities.

Among other things, the above description provides a method of obtaining a network slice service, the method comprising a virtual service provider (VSP):
determining a Mobile Network Operator (MNO) that can provide a desired service by accessing a global service repository comprising service profiles describing network slice services available in the network, each service profile being maintained by a respective MNO each service profile comprising attributes defining characteristics of a respective network slice service offered by the MNO, the network slice service comprising any one or more of: a Virtual Network with E2E service requirements; a Virtual Network with a specified network topology; and a virtualized infrastructure;
sending a request for the network slice service to the determined MNO; and
subsequently receiving a Service Level Agreement (SLA) for the network slice service from the MNO;
wherein: each service profile comprises attributes defining characteristics of a respective network slice service in a predetermined format; and the VSP serves a plurality of User Equipments (UEs).

In embodiments in which the network slice service comprises a virtualized infrastructure, the VSP may instantiate one or more network functions on the virtualized infrastructure, and/or configure already instantiated network functions on the virtualized infrastructure Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method performed by a mobile network operator (MNO), the MNO configured to service a plurality of virtual service providers (VSPs), the method comprising:
providing one or more service profiles to a virtual service provider (VSP) of the VSPs serving a user population including a plurality of user devices, each service profile associated with a different respective one of a plurality of network slice services offered by the MNO and comprising attributes defining characteristics of said one of the network slice services offered by the MNO;
receiving a request for a network slice service associated with a service profile of the one or more service profiles from the VSP; and
determining that the network slice service can be provided by the MNO based on the MNO being able to satisfy one or more requirements;
sending a Service Level Agreement (SLA) for the requested network slice service to the VSP; and
after receiving an accepted SLA for the requested network slice service from the VSP, providing, to the VSP, a network slice service instance for the requested network slice service in accordance with the accepted SLA for the requested network slice service, the network slice service instance: either accommodating specified end-to-end (E2E) service requirements, or having a specified network topology, or both accommodating said specified E2E service requirements and having the specified network topology.

2. The method as claimed in claim 1, wherein the network topology comprises one or more of:
instantiated network functions;
defined network function chains;
pre-configured routing;

a predetermined capacity;
predetermined resources; and
a capability of either one or both of control and management by 3rd parties.

3. The method as claimed in claim 1, wherein the specified network topology comprises one or more of:
one or more instantiated Virtual Network Functions;
one or more of Physical Network Functions; and
one or more physical nodes configured to host at least one Virtual Network Function.

4. The method as claimed in claim 1, further comprising:
receiving a second request for a second network slice service associated with a service profile of the one or more service profiles from the VSP;
determining that the requested second network slice service cannot be provided by the MNO based on the MNO not being able to satisfy all requirements of the requested second network slice service;
identifying another MNO that can provide at least a portion of the requirements of the requested second network slice service;
sending the request for a third network slice service to the identified other MNO, the third network slice service encompassing the at least a portion of the requested second network slice service;
receiving a Service Level Agreement (SLA) for the third network slice service from the other MNO;
sending a SLA for the requested second network slice service to the VSP; and
after receiving an accepted SLA for the requested second network slice service, providing, to the VSP, a second network slice service instance in accordance with the accepted SLA for the requested second network slice service.

5. The method as claimed in claim 1, further comprising the MNO updating the one or more service profiles in response to a change in available capacity of the MNO.

6. The method as claimed in claim 1, wherein providing one or more service profiles to the virtual service provider (VSP) comprises maintaining the one or more service profiles in a service profile database accessible by the VSP.

7. The method as claimed in claim 1, wherein providing one or more service profiles to the virtual service provider (VSP) comprises maintaining the one or more service profiles in a global service repository accessible by the VSP wherein the global service repository comprises service profiles of two or more MNOs.

8. The method as claimed in claim 7, wherein the service profiles of the global service repository comprise attributes defining characteristics of respective network slice services offered by the two or more MNOs.

9. The method as claimed in claim 1, wherein each service profile comprises:
a business service type identifier;
at least one service type parameter associated with the business service type identifier;
at least one service quality parameter associated with each of the at least one service type parameter; and
at least one performance parameter associated with each of the at least one service type parameter.

10. The method as claimed in claim 9, wherein the business service type identifier comprises one of a connectivity as a service (CaaS) identifier, a network as a service (NaaS) identifier, a virtual network function as a service (VNFaaS) identifier, and an infrastructure as a service (IaaS) identifier.

11. The method as claimed in claim 9, wherein the at least one service type parameters characterize the service by a topological requirement for the specified network topology.

12. The method as claimed in claim 9, wherein the at least one service quality parameter identifies flow level quality of service (QoS) requirements.

13. The method as claimed in claim 9, wherein the at least one performance parameter provides throughput capability specification parameters.

14. A computing system of a mobile network operator (MNO), the MNO configured to service a plurality of virtual service providers (VSPs), the computing system comprising:
one or more central processing units (CPUs); and
a non-transitory memory storing software instructions for controlling the one or more central processing units (CPUs) to implement steps of:
providing one or more service profiles to a virtual service provider (VSP) of the VSPs serving a user population including a plurality of user devices, each service profile associated with a different respective one of a plurality of network slice services offered by the MNO and comprising attributes defining characteristics of said one of the network slice services offered by the MNO, receiving a request for a network slice service associated with a service profile of the one or more service profiles from the VSP; and
determining that the network slice service can be provided by the MNO based on being able to satisfy one or more requirements; and
sending a Service Level Agreement (SLA) for the requested network slice service to the VSP; and
after receiving an accepted SLA for the requested network slice service from the VSP, providing, to the VSP, a network slice service instance for the requested network slice service in accordance with the accepted SLA for the requested network slice service, the network slice service instance: either accommodating specified end-to-end (E2E) service requirements, or having a specified network topology, or both accommodating said specified E2E service requirements and having the specified network topology.

15. The computing system as claimed in claim 14,
wherein the specified network topology comprises one or more of:
instantiated network functions;
defined network function chains;
pre-configured routing;
a predetermined capacity;
predetermined resources; and
a capability of either one or both of control and management by 3rd parties.

16. The computing system as claimed in claim 14, further comprising software instructions for controlling the one or more central processing units (CPUs) to implement steps of:
responsive to determining that the requested second network slice service cannot be provided by the MNO based on being able to satisfy the one or more requirements:
identifying another MNO that can provide at least a portion of the requested network slice service;
sending a request for a second network slice service to the identified other MNO, the third network slice service encompassing the at least a portion of the one or more requirements;
receiving a second Service Level Agreement (SLA) for the second network slice service from the other MNO;

sending a SLA for the requested second network slice service to the VSP; and after receiving an accepted SLA for the requested second network slice service, providing to the VSP the network slice service instance in accordance with the SLA for the requested network slice service.

17. The computing system as claimed in claim 14, further comprising software instructions for controlling the one or more central processing units (CPUs) to update the one or more service profiles in response to a change in available capacity of the MNO.

18. The computing system as claimed in claim 14, wherein providing one or more service profiles to the virtual service provider (VSP) comprises maintaining the one or more service profiles in a service profile database accessible by the VSP.

19. The computing system as claimed in claim 14, wherein providing one or more service profiles to the virtual service provider (VSP) comprises maintaining the one or more service profiles in a global service repository accessible by the VSP wherein the global service repository comprises service profiles of two or more MNOs.

20. The computing system as claimed in claim 19, wherein the service profiles of the global service repository comprise attributes defining characteristics of respective network slice services offered by the two or more MNOs.

21. The computing system as claimed in claim 14, wherein each service profile comprises:

a business service type identifier;

at least one service type parameter associated with the business service type identifier;

at least one service quality parameter associated with each of the at least one service type parameter; and at least one performance parameter associated with each of the at least one service type parameter.

22. The computing system as claimed in claim 21, wherein the business service type identifier comprises one of a connectivity as a service (CaaS) identifier, a network as a service (NaaS) identifier, a virtual network function as a service (VNFaaS) identifier, and an infrastructure as a service (IaaS) identifier.

23. The computing system as claimed in claim 21, wherein the at least one service type parameters characterize the service by a topological requirement for the specified network topology.

24. The computing system as claimed in claim 21, wherein the at least one service quality parameter identifies flow level quality of service (QoS) requirements.

25. The computing system as claimed in claim 21, wherein the at least one performance parameter provides throughput capability specification parameters.

* * * * *